US012544716B2

(12) United States Patent
Bednar et al.

(10) Patent No.: US 12,544,716 B2
(45) Date of Patent: Feb. 10, 2026

(54) EXHAUST GAS TREATMENT SYSTEM AND METHOD

(71) Applicant: SodaFlexx Distribution LLP, London (GB)

(72) Inventors: Barry Bednar, London (GB); Sander Castel, Etten-Leur (NL); Elwin Koning, Bergen op Zoom (NL)

(73) Assignee: SodaFlexx Distribution LLP, London (GB)

( * ) Notice: Subject to any disclaimer, the term of this patent is extended or adjusted under 35 U.S.C. 154(b) by 36 days.

(21) Appl. No.: 18/299,981

(22) Filed: Apr. 13, 2023

(65) Prior Publication Data

US 2023/0338897 A1 Oct. 26, 2023

Related U.S. Application Data

(60) Provisional application No. 63/331,143, filed on Apr. 14, 2022.

(51) Int. Cl.
*B01D 53/81* (2006.01)
*B01D 53/34* (2006.01)
(Continued)

(52) U.S. Cl.
CPC ........... *B01D 53/81* (2013.01); *B01D 53/346* (2013.01); *B01D 53/508* (2013.01); *B01F 23/32* (2022.01);
(Continued)

(58) Field of Classification Search
CPC ........ F01N 3/021; F01N 3/085; F01N 3/0885; F01N 3/206; F01N 3/208; F01N 3/2846;
(Continued)

(56) References Cited

U.S. PATENT DOCUMENTS 5,809,775 A * 9/1998 Tarabulski .............. F01N 3/208 60/274
2004/0040288 A1* 3/2004 Jacob ...................... F17C 11/00 60/301
(Continued)

FOREIGN PATENT DOCUMENTS

EP 2818224 B1 6/2016
JP 2015221426 12/2015
(Continued)

OTHER PUBLICATIONS

Testing of a Particulate Filter System on High-Power Ships (Vessel Piana from La Méridionale), Mar. 2020; Ademe, available at https://librairie.ademe.fr/air-et-bruit/1484-traitement-des-parti.
(Continued)

*Primary Examiner* — Binh Q Tran
(74) *Attorney, Agent, or Firm* — Polson Intellectual Property Law P.C.; Margaret Polson; Christopher Sylvain

(57) ABSTRACT

A system for treating exhaust gas of a vessel having at least one engine equipped with a turbocharger includes a storage tank configured to store a powder for treating the exhaust gas, and a dosing assembly fluidly coupled to the storage tank. The dosing assembly is configured to inject the powder into the exhaust gas at or adjacent the turbocharger, and includes a nozzle for injecting the powder into the exhaust gas. The nozzle includes a conduit configured to transport the powder, and a conical member mounted to a distal end of the conduit and defining a central hole in fluid communication with the conduit for guiding a first portion of the powder through the central hole. The distal end of the conduit and the conical member together define an annular gap configured to guide a second portion of the powder through the annular gap.

31 Claims, 15 Drawing Sheets

(51) Int. Cl.

| | |
|---|---|
| ***B01D 53/50*** | (2006.01) |
| ***B01F 23/30*** | (2022.01) |
| ***B01F 25/30*** | (2022.01) |
| ***B01F 35/71*** | (2022.01) |
| ***F01N 3/08*** | (2006.01) |
| ***F01N 3/20*** | (2006.01) |

(52) U.S. Cl.
CPC ............ *B01F 25/30* (2022.01); *B01F 35/714* (2022.01); *B01F 35/7179* (2022.01); *F01N 3/208* (2013.01); *B01D 2251/304* (2013.01); *B01D 2251/606* (2013.01); *B01D 2257/302* (2013.01); *B01D 2258/01* (2013.01); *B01D 2259/128* (2013.01); *B01D 2259/4566* (2013.01); *F01N 3/0885* (2013.01); *F01N 2250/08* (2013.01); *F01N 2570/04* (2013.01); *F01N 2590/10* (2013.01); *F01N 2610/01* (2013.01); *F01N 2610/10* (2013.01); *F01N 2610/12* (2013.01); *F01N 2610/1406* (2013.01); *F01N 2610/1453* (2013.01); *F01N 2900/1402* (2013.01); *F01N 2900/1821* (2013.01); *F01N 2900/1822* (2013.01)

(58) Field of Classification Search
CPC ............. F01N 2250/08; F01N 2340/06; F01N 2570/04; F01N 2590/02; F01N 2590/10; F01N 2610/01; F01N 2610/02; F01N 2610/10; F01N 2610/12; F01N 2610/14; F01N 2610/1406; F01N 2610/1453; F01N 2900/1402; F01N 2900/16; F01N 2900/1606; F01N 2900/1814; F01N 2900/1821; F01N 2900/1822; Y02T 10/12
See application file for complete search history.

(56) References Cited

U.S. PATENT DOCUMENTS

| | | | | |
|---|---|---|---|---|
| 2005/0284135 A1* | 12/2005 | Bertiller | B01D 53/90 | 60/286 |
| 2013/0259755 A1* | 10/2013 | Kim | B01D 53/92 | 422/111 |
| 2015/0113960 A1* | 4/2015 | Ruth | F01N 3/206 | 73/40.5 R |
| 2016/0160722 A1* | 6/2016 | Döring | F01N 3/0885 | 60/605.1 |
| 2018/0258812 A1* | 9/2018 | De Cesare | F01N 3/2066 | |
| 2021/0138398 A1* | 5/2021 | Reid | B01F 23/23341 | |
| 2022/0176316 A1* | 6/2022 | McNicholas | B01D 53/9431 | |

FOREIGN PATENT DOCUMENTS

| | | |
|---|---|---|
| KR | 20160102649 | 8/2016 |
| WO | 2020148437 | 7/2020 |
| WO | 2023199117 A1 | 10/2023 |

OTHER PUBLICATIONS

Full report “Projet Test FAP test d’un système de filtres à particules sur les navires de fortes pulssances (navire Piana de La Méridionale)” (translated PAP Test Project: Test of a Particle Filter System on Ships (Vessel Piana from La Méridionale) 106 pages; Mar. 2020; Ademe available at https://librairie.ademe.fr/air-et-bruit/1484-traitement-des-particules-lines-d-un-navire-.

International Search Report (ISR) of the International Searching Authority (ISA/EP) mailed Sep. 15, 2023 in Applicant’s related international application PCT/IB2023/000222 filed Apr. 13, 2023.

Written Opinion (WO) of the International Searching Authority (ISA/EP) mailed Sep. 15, 2023 in Applicant’s related international application PCT/IB2023/000222 filed Apr. 13, 2023.

Third Party Observation submitted Apr. 24, 2024 in Applicant’s related international application PCT/IB2023/000222 filed Apr. 13, 2023.

Exhaust Gas Cleaning Systems Association, “A practical guide to exhaust gas cleaning systems for the maritime industry,” EGCSA Handbook 2012, published 2012 (82 pages).

Lloyd’s Register, “Understanding exhaust gas treatment systems—Guidance for shipowners and operators,” published Jun. 2012 (56 pages).

EPO Office Action dated Oct. 1, 2025 in related European patent application EP 23 738 572.9 by applicant Sodaflexx Distribution LLP.

* cited by examiner 152
153

152
153
154
8D
8D 115
154
152
153
146a

EXHAUST GAS TREATMENT SYSTEM AND METHOD

CROSS-REFERENCE TO RELATED APPLICATIONS

This application claims priority to U.S. Provisional Patent Application No. 63/331,143, filed Apr. 14, 2022, and titled EXHAUST GAS TREATMENT SYSTEM AND METHOD, the entire disclosure of which is hereby incorporated by reference herein in its entirety.

BACKGROUND OF THE INVENTION

1. Field of the Invention

The present invention relates to exhaust gas treatment systems and methodologies, and more particularly, to systems and methods for treating exhaust gas from ocean vessels, boats, and ships.

2. Description of the Related Art

Ocean going vessels are primarily powered by engines that burn hydrocarbons, and such ships have traditionally burned residual fuel oil, the "bottom of the barrel" left over after the crude oil refining process. This fuel has been proven to emit harmful concentrations of Sulphur compounds ($SO_x$), Nitrogen compounds ($NO_x$), Black Carbon (soot), and various heavy metals and organic compounds. The contaminates are particulate matter/particle pollution in the form of solid and liquid droplets suspended in a medium such as air, and are generally coarse (between 2.5 and 10 μm in diameter), fine (between 0.1 and 2.5 μm in diameter), or ultrafine (0.1 μm or less in diameter, such as nanoparticles). Contaminates of all particulate sizes can cause health problems and environmental damage. Inhalation of these particles, particularly the fine and ultrafine particulates, can pass deep into the lungs and blood stream, and cause decreased lung function, premature death, cardiovascular disease, and respiratory symptoms.

Particulates in engine exhaust can also be carried by the wind and settle on the ground and water, causing lake acidity, damage to crops and ecosystems, depletion of soil nutrients, and acid rain. Black carbon (soot), one form of ultrafine particulate matter in engine exhaust, is the second highest anthropogenic source of climate change after carbon dioxide. Pollution with these engine exhaust particulates can have a particularly adverse impact on coastal communities.

At the end of 2020, there were approximately 62,100 vessels in the world trading fleet, with a total deadweight tonnage of 2,033 million metric tons. By deadweight tonnage, the world fleet has doubled in size since 2005, and has increased by at least 3% since 2019. These vessels emit harmful levels of Sulphur Oxide ($SO_x$), Nitrous Oxide ($NO_x$), and particulate matter from the fuel oil they burn for propulsion. As a result, government and regulatory agencies have begun to mandate compliance with more stringent regulatory standards for exhaust emissions. By way of example, the UN's International Maritime Organization (IMO) has mandated that as of Jan. 1, 2020, ship owners must drastically reduce Sulphur emissions. In particular, the IMO has mandated that $SO_x$ emissions from fuel oil burned by ships be in the range of 0.5% S at sea and 0.1% S close to land or in designated exclusion zones. This regulation forces a mandatory reduction of 77% in overall $SO_x$ emissions in the shipping industry. The shipping industry, due to its use of High Sulphur fuel, which is much cheaper than Low Sulphur fuel, generates approximately 90% of Sulphur emissions in the transportation sector despite utilizing only approximately 7% of the fuel oil.

In order to comply with IMO 2020 regulations, ships generally have three options. A first option is to burn low Sulphur fuel comprised of diesel fuel or a blend of diesel and HSFO. This type of fuel, while readily available, is very expensive compared to High Sulphur Fuel Oil, and the process to produce it is itself detrimental to the environment as it results in smaller particulates that are harmful to respiratory health. This fuel also emits more $CO_2$ on a "well to wake" basis than HSFO. A second option is to use alternative fuels such as liquefied natural gas (LNG), Hydrogen, Ammonia, etc. However, the engine technology and distribution infrastructure needed for this is limited and extremely expensive, and there is no consensus yet on what technology will be adopted. LNG is both expensive and not widely available for use, and current technology allows for a large amount of "methane slip" that is extremely harmful to the Ozone layer.

A third and more practical option for dealing with engine exhaust pollution is to install an exhaust gas cleaning system, also known as a "scrubber." There are two types of scrubbers: a "wet scrubber" and a "dry scrubber." Wet scrubbers have been widely adopted by the marine sector. Over 5,000 vessels have them installed. However, this technology, in the predominant "open loop" mode, discharges toxic wash water effluent directly into the sea. These systems are expensive to install and operate, and require an extensive time period, including a dry dock, to install. Additionally, port states are increasingly banning wet scrubbers because of the overboard discharge. By contrast, a dry scrubber system injects a powdered absorbent, typically sodium bicarbonate (i.e., baking soda—$NaHCO_3$) into the exhaust gas stream to neutralize the Sulphur compounds therein. Dry scrubbers produce no toxic discharge, are relatively inexpensive, and have been utilized in various power plants over the years.

When using a dry scrubber for a large ocean vessel or ship with a large engine, large quantities of dry powder (referred to herein as sodium bicarbonate, baking soda, absorbent, and/or $NaHCO_3$, but not limited thereto) need to be conveyed, staged, and injected into the engine's exhaust stream. Each step of this process can be difficult, complicated, and impeded by the space limitations, fluid mechanics, machinery, and other parameters involved in individual applications. Additionally, the required quantity of absorbent needed to keep the ship's exhaust IMO compliant in any given moment can quickly vary and is not easily predictable. Enhanced and optimized systems, techniques, structures, and methodologies for storing, staging, moving, and injecting dry absorbent powder to scrub a ship's engine exhaust are needed.

OBJECTS AND SUMMARY OF THE INVENTION

This summary is not intended to identify or point to essential features or limit the scope of the subject matter claimed herein. The present invention relates to systems and methods for storing and transporting one or more dry powders such as sodium bicarbonate ($NaHCO_3$) aboard an ocean vessel, and injecting the dry powder into the vessel's exhaust for treatment thereof, with at least the following objectives:

To inject a dry powder into a vessel's exhaust gas stream in a manner which optimizes the quantity of dry powder utilized, improves absorption efficiency of the dry powder in the exhaust gas stream, and ensures emissions compliance without wasting absorbent materials;

To inject a dry powder into an exhaust stream of an ocean vessel in a plurality of directions simultaneously with one or more injectors disposed at or adjacent a turbocharger, upstream or downstream thereof, to ensure better absorbance, mixing, and reaction time;

To continuously analyze the exhaust of a vessel's engine using a gas analyzer to control a dosing unit, based on outputs from the gas analyzer, to inject absorbent into the exhaust in slow, medium, or fast dosing protocols in accordance with a type of engine utilized;

To predict an increase or decrease in the amount of sulfur produced in the exhaust of a vessel's engine using both a gas analyzer and a fuel rack which monitors a fuel injection rate, and to predict the absorbent dosing speed, quantity, or flow rate needed given the exhaust speed and the length of the pipe which guides the exhaust out of the vessel;

To utilize an automated dry powder injection system to treat multiple exhaust gas streams of an ocean vessel simultaneously along parallel flow lines, and to provide system redundancy which allows for crossover functionality of one or more blowers across the parallel flow lines;

To inject sodium bicarbonate within 0-50 meters of a turbogenerator/turbocharger or within 15 meters of the turbogenerator/turbocharger;

To provide optimum injection of absorbent into an exhaust gas stream using an improved injection nozzle having a conical section which guides absorbent and air through a central hole and an annular gap at an end of the nozzle;

To provide replaceable standardized containers of absorbent for storage and injection using a dual functioning modular storage and injection apparatus; and To provide a system which facilitates optimum and efficient storage, staging, transport, and injection of large quantities of absorbent aboard an ocean vessel to treat the vessel's exhaust.

In accordance with one embodiment of the invention, a system for treating an exhaust gas of a vessel having at least one engine equipped with a turbocharger includes a storage tank configured to store a powder for treating the exhaust gas, and a dosing assembly fluidly coupled to the storage tank and configured to inject the powder into the exhaust gas at or adjacent the turbocharger.

In accordance with another embodiment of the invention, a nozzle for injecting a powder into exhaust gas of an engine of a vessel includes a conduit configured to transport the powder, and a conical member mounted to a distal end of the conduit and defining a central hole in fluid communication with the conduit for guiding a first portion of the powder through the central hole. The distal end of the conduit and the conical member together define an annular gap configured to guide a second portion of the powder through the annular gap.

In accordance with yet another embodiment of the invention, a dosing assembly for treating an exhaust gas of an engine of a vessel with a powder includes a bottom dosing unit containing one or more blowers configured to fluidly couple to one or more flow lines, and a plurality of storage containers stacked on top of the bottom dosing unit and configured to store the powder. The plurality of storage containers are in selective fluid communication with the bottom dosing unit, and the bottom dosing unit is configured to meter out doses of the powder for injection into the exhaust gas of the engine.

As further explained in greater detail below, the present invention describes numerous embodiments, features, and variations of the invention, and provides various non-limiting examples of such embodiments, features and variations. Titles and headers are provided for convenience and ease of reading. In accordance with such further embodiments of the invention, the below detailed description and claims provide additional limitations, either in system or process form. It will be appreciated that for each system described and claimed, the invention also includes the methodologies corresponding thereto.

Other objects, advantages, features, and characteristics of the present invention, as well as the methods of operation and functions of related structural elements, and the combination of parts and economies of development and manufacture, will become readily apparent to those of ordinary skill in the art upon consideration of the detailed description with reference to the accompanying drawings, all of which form a part of this specification.

BRIEF DESCRIPTION OF THE DRAWINGS

The drawings are not intended to limit the scope of this invention, which is set forth with particularity in the claims as appended or as subsequently amended, but merely to clarify and exemplify the invention. Accordingly, a further understanding and a more complete appreciation of the present invention and many of the attendant aspects thereof may be readily obtained as the same becomes better understood by reference to the following detailed description, when considered in conjunction with the accompanying drawings, where:

DETAILED DESCRIPTION OF INVENTION

Figure 1A:
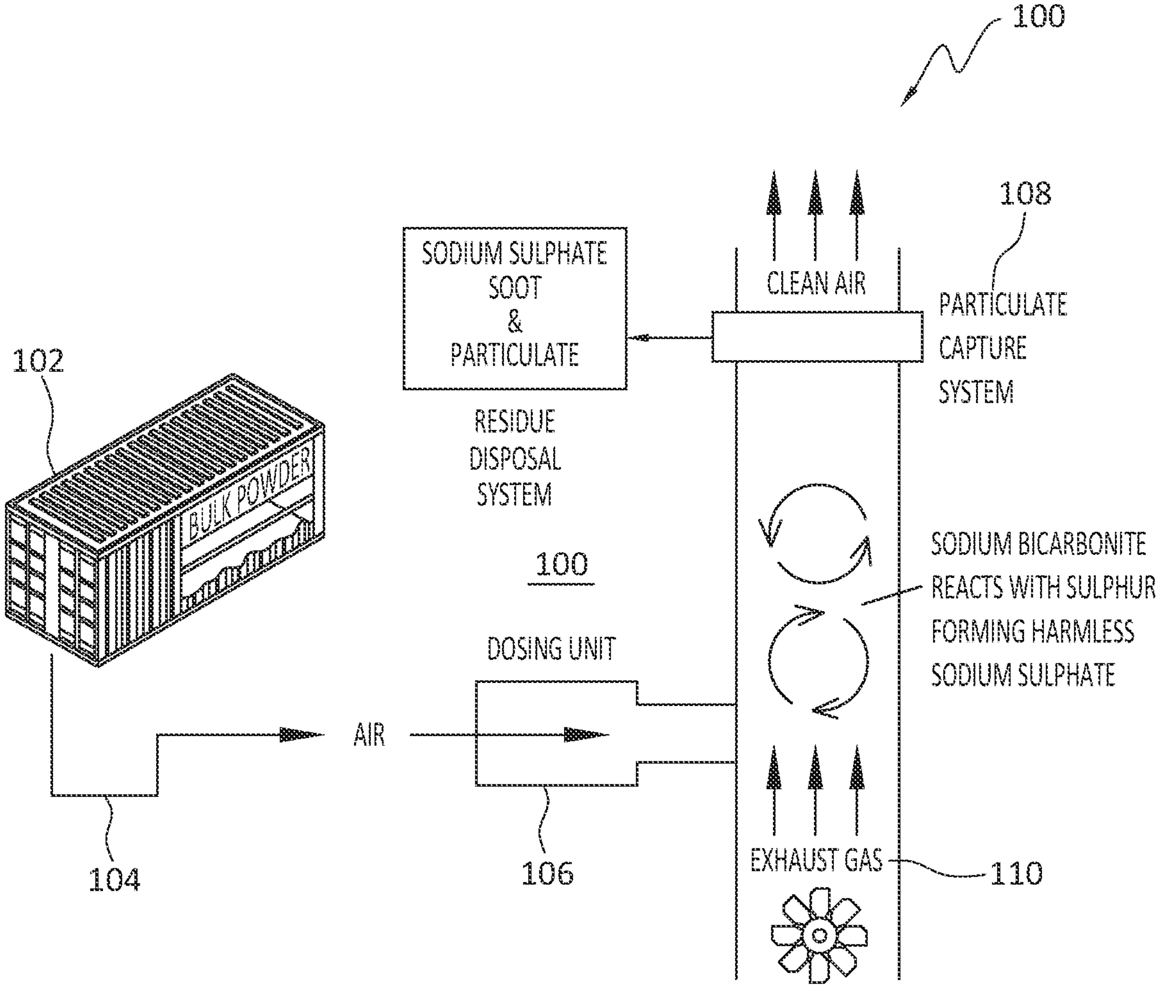
FIG. 1A is a high-level schematic diagram of an exhaust gas cleaning system in accordance with the invention.

The present invention brings dry exhaust gas cleaning to marine applications, and optimizes injection of an absorbent, typically sodium bicarbonate (i.e., baking soda) in powdered form directly into a ship's exhaust gas stream as a Sulphur ($SO_x$) absorbent during dry scrubbing to neutralize Sulphur components via a chemical reaction that results in sodium sulphate ($Na2SO_4$), a benign salt. While sodium bicarbonate is available at most major ports and is inert at normal ambient and shipboard temperatures, the required quantity needed to keep the ship's exhaust IMO compliant can vary. For example, the required quantity needed at a particular time may depend on the ship's location, movement, acceleration, engine type and efficiency, angle of list/tilt, temperature, pressure, exhaust volumetric flow rate, and other parameters, including, for example, weather conditions, the absorption efficiency of the sodium bicarbonate, and the starting Sulphur concentration of the fuel oil. The absorption efficiency depends on the type and amount of reagent, the reagent particle size, the exhaust gas temperature, the initial Sulphur concentration, the residence time, etc.

If too much sodium bicarbonate is added to the engine's exhaust, then while the ship may be IMO compliant, the absorbent will be wasted, resulting in inefficient operation. This inefficiency results in increased material costs, added downtime due to the need to replace or refill the sodium bicarbonate supply (e.g., recharge the storage tank), and/or additional storage space for the dry powder to achieve the same results for a given trip/distance. Storage of dry powder absorbent can take up a lot of space on ships, particularly when concentrated in a particular location. If insufficient sodium bicarbonate is added to the ship's exhaust during operation (e.g., if the exhaust flow rate is suddenly increased because the ship is accelerated, or for any other reason, such as the engine operating inefficiently and producing more pollutants), then the ship will not be IMO compliant.

The large number of variables involved in storing, staging, transporting, and injecting dry absorbent powder into a ship's exhaust, coupled with the various parameters associated with a ship's operation and movement in the ocean, the particular fuel burned, and the Sulphur concentration in the exhaust at any given moment, give rise to difficulties in predicting, calculating, and delivering appropriate absorbent dosing injections into the vessel's exhaust.

The present invention monitors readings from a fuel rack of the engine and an exhaust gas monitoring system that monitors the engine's exhaust, and continually adjusts the injection of dry powder into the ship's exhaust gas stream in a manner which provides optimum efficiency. In certain embodiments, the invention also captures the salt and fine particulates present in the exhaust gas stream, emits clean air, and stores the captured fine particulates onboard, allowing for safe disposal offshore. These effects can potentially reduce climate change and the adverse effects of toxic emissions on human health, and further protect and conserve life underwater.

The present invention also helps to support the UN and IMO sustainability goals by capturing and treating the sodium sulphate and other particulate matter and combustion byproducts to provide exhaust cleaning with zero discharge. Unlike a wet scrubber, the present invention eliminates the need for dry-docking procedures as no modifications to a ship's sea-chest or the underwater area are needed. The invention also eliminates the need for hazardous chemicals and exotic materials, harmful wash water discharge, stability issues resulting from large quantities of water stored high up in a vessel's funnel, and high capital fuel expenditures.

In certain embodiments, the sodium bicarbonate is injected into a ship's exhaust at an injection point or multiple injection points at or adjacent the turbocharger, upstream or downstream thereof, to help ensure optimal reaction time and avoid expensive engine modifications. In other embodiments, customized solutions are provided by monitoring, adjusting, and maximizing $SO_x$ absorption rates, which ensures greater efficiency. In accordance with certain embodiments, the invention utilizes ideal injection point(s), location(s), angle(s) into the exhaust stream, material properties, and a particular nozzle configuration and shape to help ensure optimal injection of absorbent into the exhaust gas. Dispersion of the absorbent is controlled by software and an injection nozzle disposed inside the exhaust directly before or after the turbo charger. The unique nozzle design spreads the absorbent over the entire cross-sectional area of the exhaust, which allows for better absorption, capture, chemical reaction with, and/or neutralization of most of the sulfur compounds. The invention also eliminates the need for a scrubber tower and sea water injection, and provides absorbent milled to the ideal specification to increase its active surface area, thereby further increasing $SO_x$ absorption.

As further described below, the system of the present invention includes one or more bulk storage tanks configured as horizontal tanks or vertical silos, a sodium bicarbonate transport system, a dosing assembly with one or more injectors, and an exhaust gas monitoring system fully integrated with a ship's engine control system to ensure cost effective operation and optimal dosing of the absorbent for a required emissions zone. The system also optionally includes a particulate capture system for collecting non-toxic salts and other particulate matter for safe disposal. The system can be retrofitted to individual ships, and in certain embodiments, includes smaller modular replacement units (e.g., stackable dosing tanks or cartridges) which can be stacked on top of one another and placed in fluid communication with the sodium bicarbonate injection system, whereby replacement of the store of sodium bicarbonate is easier. As discussed in more detail below, the storage tanks can be integrated, compact units, and/or modular units.

The present disclosure is not intended to be limited to the specific terminology selected, and it will be understood that each specific element of overall system 100 of the invention, schematically depicted in FIGS. 1A, 1B-1, and 1B-2, includes all technical equivalents which operate in a similar manner. Techniques, methods, systems, and operating structures in accordance with the invention may be embodied in a wide variety of forms and modes, some of which may be quite different from those in the disclosed embodiments. Consequently, the specific structural, functional, mechanical, and step-by-step details disclosed herein are merely representative. The embodiments herein are described in sufficient detail to enable those skilled in the art to practice the embodiments, and it is to be understood that logical, mechanical, and other changes may be made without departing from the scope of the embodiments, and that the description herein is not to be taken in a limiting sense.

Each element in any methodologies shown or described herein which depict a step or a group of steps of a system, a computer-implemented system, and/or a methodology in which dry powder is processed, transported, staged, and injected into engine exhaust may contain one or more sub-steps. For purposes of illustration and explanation, these steps, as well as all other steps or sub-steps identified and described, are presented in a certain logical order. However, it will be appreciated that any exemplary embodiments described herein can contain an alternate order of the steps adapted to a particular application of a technique disclosed, and that any such variations and/or modifications are intended to fall within the scope of the invention. The depiction and description of steps in any particular order is not intended to exclude embodiments having the steps in a different order, unless required by a particular application, explicitly stated, or otherwise clear from the context.

It will be appreciated that certain modules of the systems, platforms, and methods described herein may be implemented and accessed using an interfacing mobile app on an internet enabled mobile device's operating system, such as, for example, Android, iOS, or Windows Phone OS, and by using a web interface, and that different types of users may utilize different functionalities. By way of example, MODBUS communication from CargoFlexX may be utilized. Systems described herein may include implementations through a combination of hardware and software that operate on a stationary or portable computing device on a ship, and may comprise various preprogrammed features combined, integrated with, and/or in communication with basic components, including but not limited to, one or more servers, databases, mobile end applications, web portals, network settings, etc. With the support of these components, the system provides the services and functionalities through user interfaces in one or more displays, websites, or mobile applications.

The system may have more than one server in a distributed structure with support from data centers located anywhere in the world. Implementations may be communicatively linked and cross-platformed so that a user may be provided with information relevant to his or her inquiry, including for example, information associated with pressure sensors, temperature sensors, exhaust flow rates, chemical and particulate or sulfur concentrations, exhaust speed, feeding mechanisms, and the like. The system may function on more than one computer architecture, operating system, application software, application programming interface (API), web application, etc. It will be appreciated that computer program instructions used by systems described herein and/or the apps for use with the system may include computer executable code in one of a variety of languages, including, for example, C, C++, Java, JavaScript, etc.

Referring now to FIG. 1A of the drawing, a schematic diagram of an exemplary exhaust gas cleaning system 100 schematically illustrates one embodiment of the system and methodology of the invention. As shown, system 100 includes a bulk storage tank 102, an absorbent conveying system 104, a dosing assembly 106 (also referred to herein as a dosing unit) which periodically or continually supplies dry powder (e.g., sodium bicarbonate) from one or more bulk storage tanks 102, via absorbent conveying system 104, to dosing assembly 106, and ultimately, to exhaust gas 110 from the ship's engine. In certain embodiments, a particulate capture system 108 may be provided which captures non-toxic salts and other particulate matter produced by the reaction of the sodium bicarbonate with the ship's exhaust. Each of storage tank 102, absorbent conveying system 104, dosing assembly 106, and particulate capture system 108 is separately discussed below.

System 100 ensures that the $SO_x$ content of exhaust gas of a marine engine is maintained within IMO 2020 guidelines by analyzing data from a metering system (e.g., a continuous emission monitoring system) which monitors sulfur oxide levels in the exhaust for compliance, and injecting an appropriate amount of absorbent sodium bicarbonate directly into a marine engine's exhaust stream. The absorbent reacts with the Sulphur ($SO_x$) compounds in the exhaust gas (e.g., neutralizes sulfur oxides generated during combustion) and converts them to Sodium Sulphate ($Na_2SO_4$), a highly stable and non-toxic salt. This salt can be expelled into the atmosphere or collected and treated for disposal onshore by particulate capture system 108.

System 100 is capable of an $SO_x$ removal rate of nearly 100%. As a result, when using system 100, emissions from lower cost 3.5% sulfur fuel will be approximately equivalent to emissions from higher cost 0.1% sulfur fuel (e.g., within the acceptable range), with compliance demonstrated based on $SO_2$(ppm)/$CO_2$(% v/v) ratio values when petroleum-based distillate or residual fuel oils are used. $CO_2$ emissions on a "well to wake" basis have now been adopted as a measure of emissions based on respective fuels that vessels can burn. The systems and methods of the present invention also allow for the best $CO_2$ option for conventional vessels.

System Operation

Figures 1, 1B:
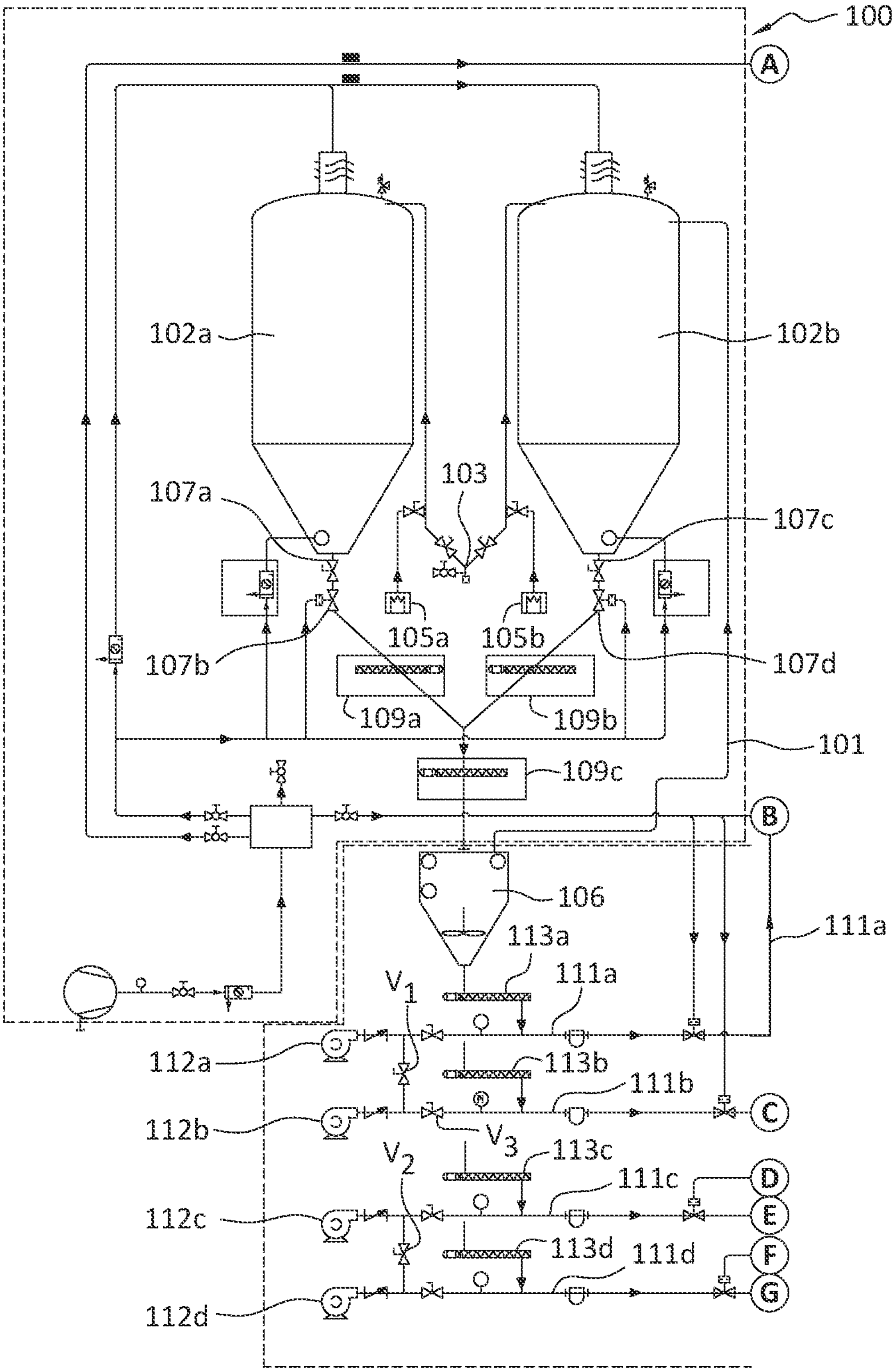
FIGS. 1B-1 and 1B-2 together form a more detailed schematic diagram of an embodiment of the exhaust gas cleaning system in accordance with the invention, showing the operative arrangement of system components and the process flow of absorbent from storage to injection.
Figures 1, 1B, 2:
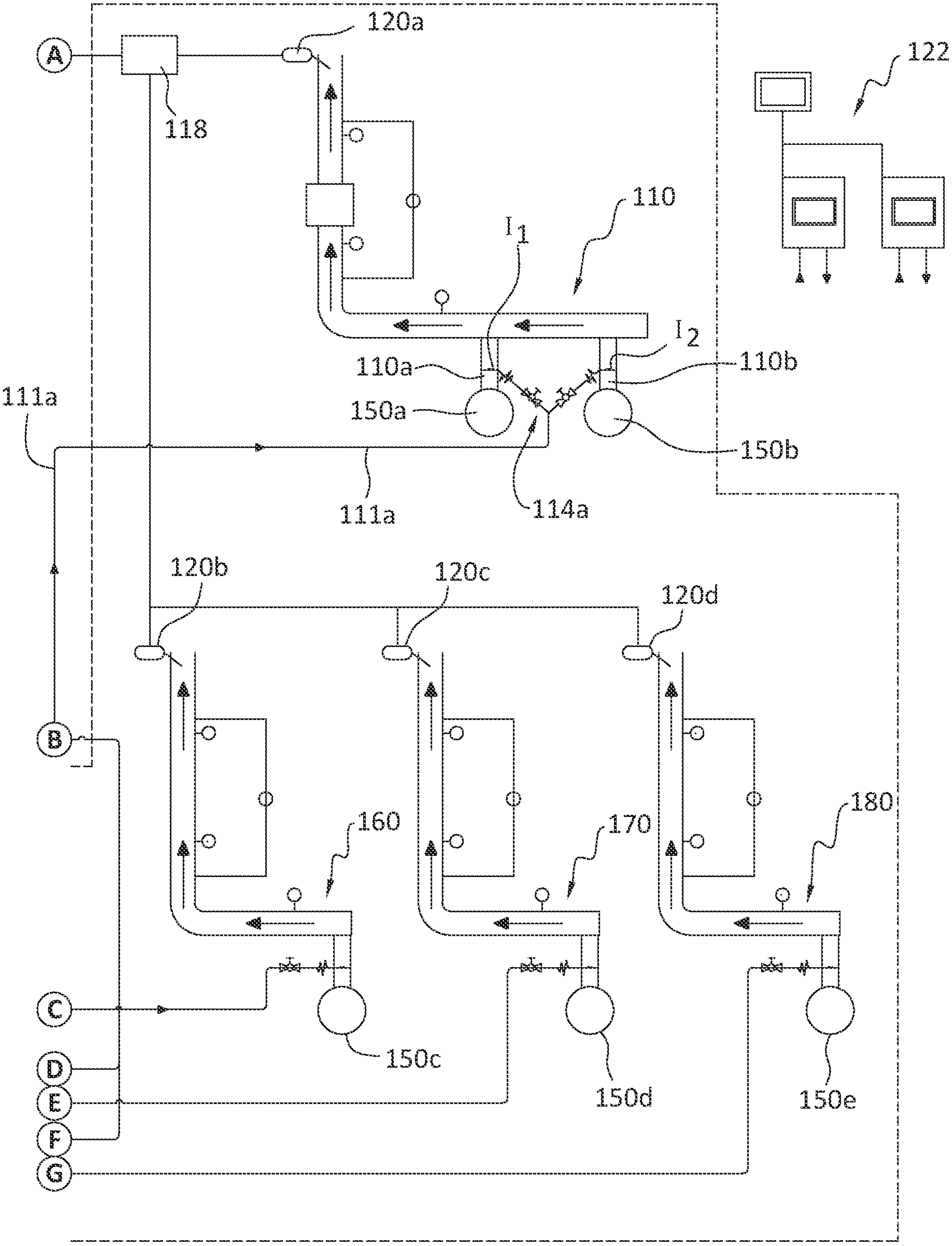

As shown in FIGS. 1B-1 and 1B-2, in one embodiment, system 100 includes two bulk storage tanks 102*a*, 102*b* configured as vertical silos for storing 50-300 metric tons of bulk absorbent (e.g., $NaHCO_3$). Bulk storage tanks 102*a*, 102*b* may be placed on the deck of an ocean vessel or at a higher location, and filled via fill line 103, which may be fluidly coupled to dryers 105*a*, 105*b* for ensuring the powder is dry prior to entering bulk storage tanks 102*a*, 102*b*. Storage tanks 102*a*, 102*b* are selectively fluidly coupled to dosing tank 106 via valves 107*a*, 107*b*, 107*c*, 107*d*. The absorbent is transported from storage tanks 102*a*, 102*b* to dosing tank 106 via gravity, one or more screw augers 109*a*, 109*b*, 109*c*, and/or via vacuum suction through one or more commercial blowers. Ventilation line 101 allows air inside dosing tank 106 to escape to bulk storage tank 102*b* when dosing tank 106 is filled. Dosing tank 106 is fluidly coupled to a plurality of injection lines 111*a*, 111*b*, 111*c*, 111*d* which connect to a ship's main engine exhaust and auxiliary engine exhaust streams. In other words, in the present embodiment, dosing tank 106 can feed absorbent to up to four different engine exhaust lines simultaneously. Dosing tank 106 may be operatively associated with the four different engine exhaust lines via one or more additional screw augers 113*a*, 113*b*, 113*c*, 113*d* which help drive the absorbent to each injection line 111*a*, 111*b*, 111*c*, 111*d*. Screw augers 113*a*-113*d* directly connect to dosing tank 106 (e.g., under dosing tank 106) and fluidly couple dosing tank 106 to each injection line 111*a*-111*d*. Screw augers 113*b*, 113*c*, and 113*d* are schematically shown separated from dosing tank 106 in FIG. 1B-1 for ease of viewing.

Injection line 111*a* routes, via blower 112*a*, absorbent from dosing tank 106 to an injector assembly 114*a*, which injects the absorbent into two exhaust pipes 110*a*, 110*b* of main engine exhaust 110 (FIG. 1B-2). Injector assembly 114*a* includes nozzles (further discussed below) which inject absorbent into exhaust pipe 110*a* at or adjacent turbocharger 150*a* (e.g., at location $I_1$), and into exhaust pipe 110*b* at or adjacent turbo charger 150*b* (e.g., at location $I_2$). The nozzles of injector assembly 114*a* include a number of unique features that optimally distribute the absorbent across the entire cross-sectional area of exhaust pipes 110*a*, 110*b* at locations ($I_1$, $I_2$), and are further discussed below with respect to FIGS. 6A-6D.

Locations $I_1$ and $I_2$ where absorbent is injected are respectively within fifty meters, and preferably within fifteen meters, of turbochargers 150*a*, 150*b*, and may be located upstream or downstream thereof or at/adjacent thereto. In certain embodiments, the respective distances between injection locations $I_1$ and $I_2$ and turbochargers 150*a*, 150*b* is zero (i.e., injection of the absorbent occurs at turbochargers 150*a*, 150*b*). In other embodiments, the respective distances between the injection locations and the turbochargers are in a range of five to fifteen meters, but are preferably as close as possible to the locations of turbochargers 150*a*, 150*b*.

It will be appreciated that the longer the sodium bicarbonate is in contact with the exhaust, the more efficiently it is able to react with and neutralize sulfur compounds and other harmful compounds in it. Engine exhaust can be moving at speeds of, for example, at least twenty to twenty-five meters per second. Thus, an exhaust pipe that is fifty meters long only provides a maximum of about two seconds to treat the exhaust before it is released to other portions of the exhaust piping system and/or ambient/outside air. The parameters and considerations associated with an exhaust piping system are numerous, and include, for example, the exhaust gas flow rate or velocity, temperature ranges, pressure drop, back pressure, noise level, and waste heat recovery. Regardless of the parameters of particular applications, the time for treatment of the exhaust gas is very short in all or nearly all marine applications. Thus, the present invention locates the nozzles of injector assembly 114*a* as close as possible to turbocharges 150*a*, 150*b*.

If injection of the absorbent into the exhaust were to occur further downstream of the turbocharger, then one or more seconds of time would be lost, and treatment by the absorbent would be partially or wholly ineffective, and far more inefficient. Inefficient injection (e.g., due to reduced reaction time because of downstream injection and/or sub-optimal injection at the injection location(s)) necessitates a larger quantity of absorbent to achieve the same reduction in sulfur or carbon compounds, assuming such reduction is even possible if sub-optimal injection occurs and/or the exhaust pipe length downstream of the injection point is minimal. As conventional turbochargers are very expensive and rotate at twenty thousand revolutions per minute, fear of the unknown and/or fear of damaging turbochargers has curtailed conventional experimentation in this area in the marine industry. The inventors of the inventions described herein (hereafter "the inventors") have found that the manner in which absorbent is injected using a specifically designed nozzle (FIGS. 6A-6D) sufficiently spreads the absorbent across the exhaust stream and avoids damage to the turbocharger, even when the absorbent is injected at or adjacent the turbocharger.

In certain embodiments, exhaust pipes 110*a*, 110*b* may be elongated to allow for longer chemical reaction time. It will be appreciated that the faster the exhaust, the longer the pipe that is needed and/or the more absorbent that is needed to produce more chemical reactions over a shorter time frame. Thus, injecting near the turbocharger also saves space and avoids the need for longer exhaust piping and/or more absorbent to ensure compliant treatment of the exhaust.

Continuing with FIGS. 1B-1 and 1B-2, injection lines 111*b*, 111*c*, and 111*d* route absorbent, via respective blowers 112*b*, 112*c*, 112*d*, to auxiliary exhaust 160, 170, 180 of auxiliary engines of the ship. The absorbent is similarly injected adjacent turbochargers 150*c*, 150*d*, 150*e* of the auxiliary engines. Injection lines 111*a*, 111*b*, 111*c*, and 111*d* may be selectively fluidly coupled to one another by, for example, valves ($V_1$, $V_2$), whereby if one of blowers 112*a*, 112*b*, 112*c*, 112*d* fails, another blower of the group can be utilized to force absorbent to the desired engine. By way of example, if blower 112*a* were to fail, then valve $V_1$ could be opened, valve $V_3$ could be closed, and blower 112*b* could be utilized instead of blower 112*a* to drive absorbent along injection line 111*a* to exhaust 110 of the main engine. This configuration of system 100 allows for automatic change-over by a computing system 122 of system 100 should one of the blowers fail. The coordination of opening and closing of the various valves and blower operation in system 100 may be preprogrammed in accordance with desired outcomes in the event of one or more emergencies and/or equipment failure.

As shown, system 100 also includes a gas analyzer 118 and one or more probes 120*a*, 120*b*, 120*c*, 120*d* (FIG. 1B-2) for respectively sensing exhaust 110 of the main engine and exhaust 160, 170, 180 of the auxiliary engines. Probes 120*a*, 120*b*, 120*c*, 120*d* are in operative communication with gas analyzer 118, and provide data thereto regarding temperature, pressure, and sulfur measurements in the exhaust gas of each of the different engines. System 100 also includes one or more sensors operatively associated with the fuel rack (not shown) for continuously determining how much fuel is being utilized by each engine of the vessel. Computing system 122 may be configured to receive data from gas analyzer 118, probes 120*a*, 120*b*, 120*c*, 120*d*, fuel rack sensors, and any other system components or equipment that output data. The fuel rack is part of the vessel, and may be configured differently as needed. In one embodiment, computing system 122 may receive an analogue signal (e.g., 4-20 mA) to receive information from the fuel rack. Computing system 122 may include any components described above for computing systems and devices described herein, including, for example one or more processors, remote computing devices, displays, memory, databases, servers, touch screens, apps, programs, and the like.

In accordance with various embodiments of the invention, computing system 122 may implement one or more modes of operation or software protocols for optimized injection of the absorbent into exhaust 110, 160, 170, 180 of the engines of the ship. Such calculations may factor in preestablished correlations between a measured fuel consumption rate in real time and the amount of absorbent injected. Computing system 122 can calculate the quantity of absorbent to inject and how often to inject, the time periods for injection, changes in the injection rate, etc., and may vary these amounts depending on the type of vessel and the signals, sensors, and data available.

In one embodiment, computing system 122 is configured to control the dosing of the absorbent using only data from gas analyzer 118. In other words, in such embodiments, continuous measurements of gas analyzer 118 (e.g., sulfur concentrations detected in the exhaust gas downstream of the injection points) continuously effects the dosing amount calculated by computing system 112 for each engine. A gas analyzer 118 may be installed at the end of each exhaust pipe. Probes 120*a*-120*d* take continuous samples of sulfur and $CO_2$ content. Computing system 122 automatically calculates a ratio between the Sulfur and $CO_2$ detected in the exhaust gas, and uses this ratio to calculate injection requirements depending on the geographical position of the vessel.

For example, the ratio of Sulfur to $CO_2$ needed may vary depending on whether or not the vessel is in or outside of a Sulphur Emission Control Area (SECA). SECA is a maritime area in which strict controls of merchant ships are established. In SECA locations, a vessel may emit a ratio of 4.3 $SO_2$(ppm)/$CO_2$(% v/v). Outside of a SECA area, a vessel may emit a ratio of 21.7 $SO_2$(ppm)/$CO_2$(% v/v). An operator of computing system 122 may select, using a mechanical or electronic push button on a display, which SECA mode is to be implemented. The ratio may be between zero and 195 $SO_2$(ppm)/$CO_2$(% v/v). Within SECA, the maximum allowable ratio is 4.3, and outside SECA, the maximum allowable ratio is 21.7.

When the ship's engine is running and gas analyzer 118 sends the ratio to computing system 122 (or when computing system 122 calculates the ratio based on data gas analyzer 118 provides), computing system 122 determines whether to increase or decrease the speed of a dosing screw to increase or decrease the amount of absorbent injected in the exhaust for each engine.

In certain embodiments, when computing system 122 calculates a ratio higher than a value which is one less than the allowable ratio limit (e.g., within SECA, a ratio of Sulfur to $CO_2$ to between 3.3 and 4.3, which means the Sulfur content is approaching the limit), computing system 122 increases the speed of the dosing screw auger associated with the injector, and more absorbent is injected into the exhaust stream. In certain embodiments, once computing system 122 calculates a ratio of Sulfur (e.g., $SO_2$) to $CO_2$ which is at least two less than the allowable ratio limit (e.g., within SECA, a calculated ratio equal to or less than 2.3, which means the Sulfur content is well within the allowable limit), computing system 122 stops increasing the speed of the dosing screw and begins to slowly decrease it. Such decrease continues until the higher limit is approached or reached again (e.g., a calculated ratio of Sulfur to $CO_2$ between 3.3 and 4.3), and the process repeats.

When changing the injection rate of absorbent and analyzing the exhaust gas, it will be appreciated that there is a time lag between a change in the former and a measured change in the latter. The time lag can even be up to 1 or 2 minutes depending on the pipe lengths involved, which can cause a rapid increase or decrease in the use/consumption of absorbent. In order to avoid this, system 100 may incorporate a number of parameters, either via or without computing system 122. In certain embodiments, computing system 122 is configured to allow an operator to choose between slow, medium or fast acting dosing protocols for increasing or decreasing the dosing speed. The slower computing system 122 makes adjustments, the more stable the flow and values will be. However, if computing system 122 is too slow to make adjustments, then this may result in a calculated ratio of Sulfur to $CO_2$ which is over the limit.

It will be appreciated by those skilled in the art that the right setting will depend on the type of engine used. Another way to avoid overdosing (i.e., using too much absorbent whereby the absorbent is wasted) is configuring computing system 122 to vary the dosing only within a pre-set dosing speed range. In this manner, instead of increasing the speed by 100% of the amount calculated, the calculated acceleration and deceleration may be limited to 20%-60%. The software running on computing system 122 may be self-learning, whereby when an upper limit is reached for a longer time period, computing system 12 will move the entire range one step up.

In other embodiments, computing system 122 is configured to control the dosing of the absorbent using data from both gas analyzer 118 and the fuel rack, which indicates how much fuel is being injected into the engine. Since computing system 122 immediately knows the amount of fuel injected into the engine, the increase or decrease of sulfur can be predicted without delay, and the dosing speed can be adapted. This methodology results in lower absorbent consumption and less overlimit alarms with very long pipe lengths between the dosing system and the injection points and/or long exhaust pipes.

Various components of system 100 as schematically illustrated and described above with respect to FIGS. 1A, 1B-1, and 1B-2 are implemented through different embodiments and methodologies as further described below. It will be appreciated that the system components of different embodiments may be used individually, collectively, and additively as needed in accordance with the invention in various applications and combinations. System 100 is intended to provide improvements and enhancements across all aspects of storing, transporting, staging, and injecting absorbent to exhaust gas in a wide variety of maritime applications and different types and sizes of ocean vessels.

Storage Tank

Figure 2A:
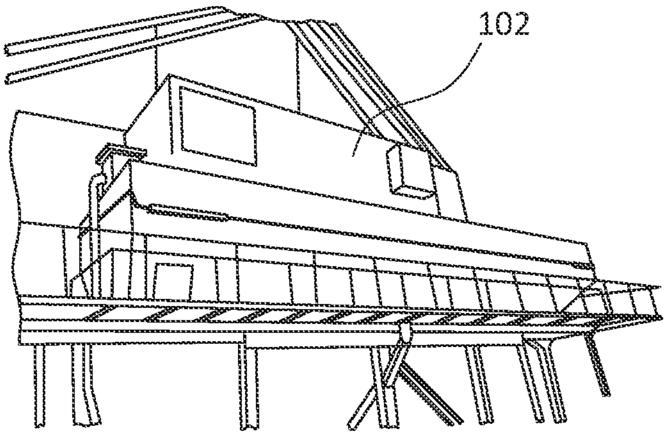
FIG. 2A is a perspective side view of a bulk storage tank of the exhaust gas cleaning system of FIG. 1A.
Figure 2B:
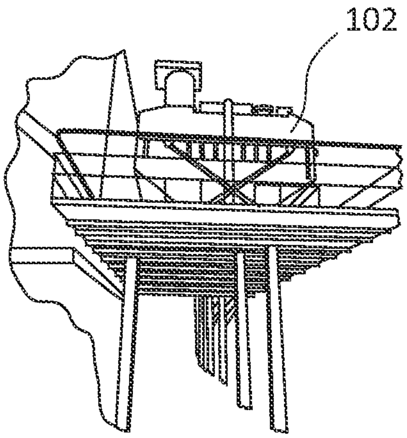
FIG. 2B is a perspective end view of the bulk storage tank of FIG. 2A.

Referring to FIGS. 2A-2B, side-perspective and end-perspective views of bulk storage tank 102 of FIG. 1A are shown. Bulk storage tank 102 is configured to store bulk sodium bicarbonate, and may be configured as a 76 $m^3$ horizontal storage silo and day tank combined to form a machinery tank container (MTC). Various dimensions may be utilized for bulk storage tank 102 depending on available space. In certain embodiments, bulk storage tank 102 may have the characteristics of Table-1 below.

TABLE 1

| | |
|---|---|
| Capacity* | 76 $m^3$ |
| L × W × H* | 13.5 × 3.2 × 3 m |
| Dry Weight* | 3,000 kg |
| Material | S 235JR/S 275JR |
| Lifting Lugs | 4 × suitable for weight of tank attached to the top of the tank |
| Filling Connection | DN100 for pneumatic loading. Ø240 mm inner Ø114 mm (12 × holes Ø20 mm) |
| Discharge Pipe Connection | DN100 to Dosing Tank. Ø240 mm inner Ø114 mm (12 × holes Ø20 mm) |
| Horizontal Screw Conveyor | 1 × 273 mm diameter frequency controlled to 17 $m^3$/hr |
| Continuous Level Sensor | 3 × Vega 100% interference-free 80 Gh2 continuous level sensor specifically designed to measure powder in a dusty environment |
| Vibration Air Pads (fluidization pads) | 1 set dry injection panels fitted in the storage tank to avoid absorbent bridging |
| Pnuematic Vibrators | 1 set fitted is the storage tank to avoid absorbent bridging |
| Access Hatches | 2 × DN500 bolted (at the sides)<br>1 × DN500 bolted (on top) |
| High/Low Level Sensors | 2 × high/2 × low (Vega) |
| Ventilation Line | DN125 |
| Pressure Relief Valve | 1 |
| Max Filling Signals | visible and acoustic |
| Conservation | 1 × layer two component primer<br>1 × layer two component intermediate coating<br>1 × layer heavy duty coating 240 mu<br>painting cycle: class C2 |
| Colour | RAL 7038 |
| Interior Coating | epoxy |
| Safety | full complement of labels for indication/warning/safety |

Other parameters, dimensions, and settings may be utilized. Bulk storage tank 102 may be placed in a ship's starboard aft location, and provided with fluidization strips to control internal atmospheric conditions. The fluidization strips inject dry air into the void space to mitigate condensation and protect against caking of the absorbent sodium bicarbonate. Storage tank 102 may be filled via pneumatic trucks or from a silo. During filling, as excess ventilation air escapes from storage tank 102 to the atmosphere, the air may be filtered by a dust prevention system to ensure compliance with EU and Global regulations (e.g., 5 mg/$m^3$ for dust emissions).

An automated cleaning system may also be provided that prevents clogging of the filters and extends the lifespan of the filter cartridges. The cleaning system may include filters that can be changed without entering storage tank 102 (e.g., outside of storage tank 102). The dust prevention system can utilize, for example, a filter cartridge array of nine 120 mm×1,200 mm cartridges and define a total filter surface area of 20 $m^2$. The cleaning system may be configured to receive cleaning air sourced from a process air compressor, and placed in fluid communication with a dump line connected to a conveying line to a day tank. The dust prevention system is preferably configured with an air flow rate of 1,200 $m^3$/hr and an air speed of 0.0167 m/s.

Figure 2C:
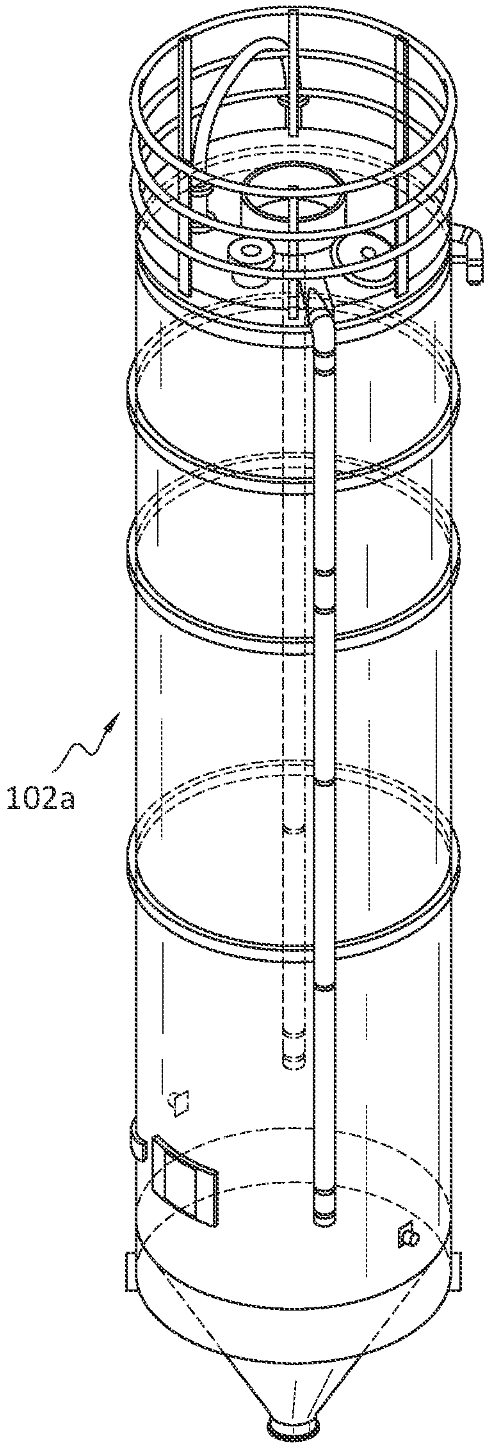
FIG. 2C is a perspective view of the bulk storage tank of the exhaust gas cleaning system of FIG. 1B, configured as a vertical silo, in accordance with the invention.
Figure 2D:
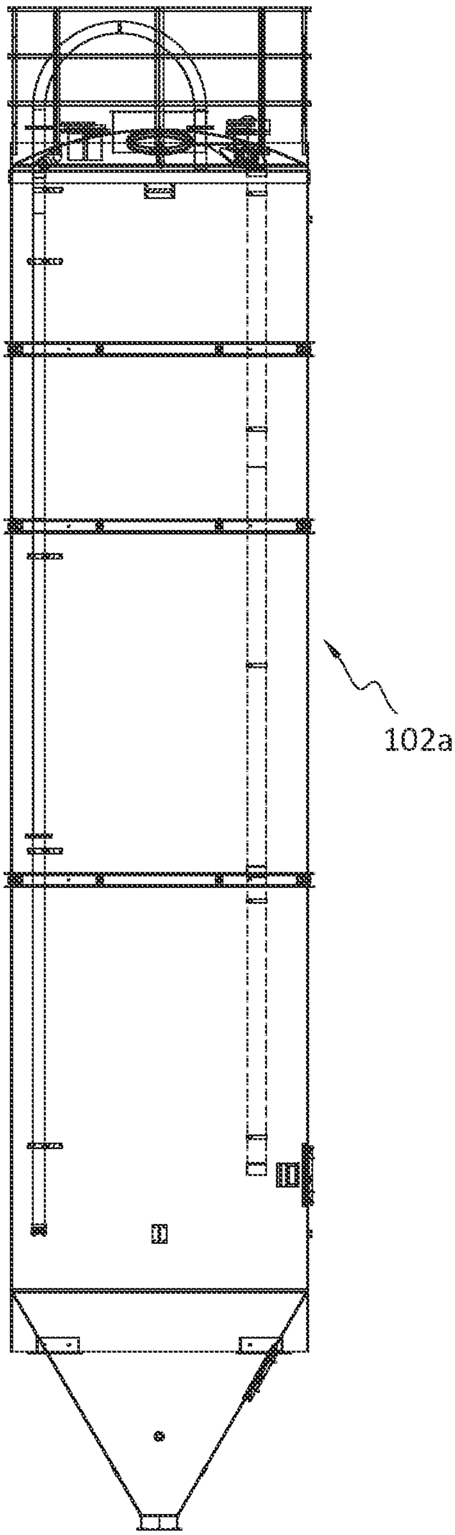
FIG. 2D is a side view of the bulk storage tank of FIG. 2C.

As discussed above with respect to FIGS. 1B-1 and 1B-2, in certain embodiments, another bulk storage tank 102*a* is configured as a vertical silo or a plurality of integrated silos depending on the particular application and installation. By way of example, as shown in FIGS. 2C, 2D, bulk storage tank 102*a* is an MIP vertical silo (https://www.mip-nv.com/en/silos) made of Glass Reinforced Epoxy (GRE). The inventors have found that this type of bulk storage tank 102*a* is optimal for storing the absorbent due to much smoother interior surfaces and less of a propensity to induce condensation on such internal surfaces, which reduces or eliminates caking of the absorbent. By contrast, storage tanks conventionally used to store dry powder are made of steel or steel composites, which form condensation that wets the absorbent, making it harder to transport, manipulate, and inject. Additionally, the inventors have found that such vertical silos made of fiberglass are sufficiently robust for use in the systems and methodologies disclosed herein. Such vertical silos also weigh about 25% less than conventional storage tanks used for bulk storage of absorbent, and take up less surface area on deck.

Absorbent Conveying System

Absorbent conveying system 104 of FIG. 1A may include pneumatic and aeromechanical conveying features (e.g., a pressurized conveyor) for conveying the sodium bicarbonate from storage tank 102 to dosing assembly 106 by an electrically powered self-contained blower/vacuum unit installed on top of a dosing tank of dosing assembly 106. Such blower/vacuum unit provides suction to transport the sodium bicarbonate from storage tank 102, through one or more blower lines as described above with respect to FIGS. 1B-1 and 1B-2 above, to the dosing tank of the dosing assembly 106. Such blower lines may be formed from, for example, a DN65 pipe that transports the absorbent to an engine room where the engine of the ship and dosing tank are located. Transport of the absorbent from bulk storage may be accomplished by pneumatical conveyance, gravity, and/or screw conveyors as noted above.

In certain embodiments, absorbent conveying system 104 may be configured with a variable frequency drive that, under control by system 100, drives a feed screw to provide metered dosing of sodium bicarbonate into a blower line, separate and apart from control of the injector by system 100. In this manner, the absorbent may be conveyed between bulk storage tank 102 and the dosing tank without interrupting the injection process. In one exemplary embodiment, absorbent conveying system 104 is configured with an inlet pressure of 1 bar, an inlet temperature of (−10° C. to 50° C.), and relative humidity of 0-95%. Absorbent conveying system 104 may also be configured with the exemplary characteristics and parameters of Table-2 below. Other configurations may be utilized.

TABLE 2

| | | |
|---|---|---|
| Medium | | Air |
| Max Vacuum Flow | l/s | 67 |
| Max Vacuum Pressure | bar(g) | −0.8 |
| Cooling Type | | Air |
| Dimensions | mm (dia × h) | 250 × 1,060 mm |
| Weight | kg | 286 |
| Material | | S5304 |
| Noise Level at 1 meter | dB(a) | 77 |
| Absorbed Power | kW | 5.5 |
| Voltage | V/ph/Hz | 400/3/50 |
| Starting | | DOL |
| Protection | | IP55 |

Figure 3:
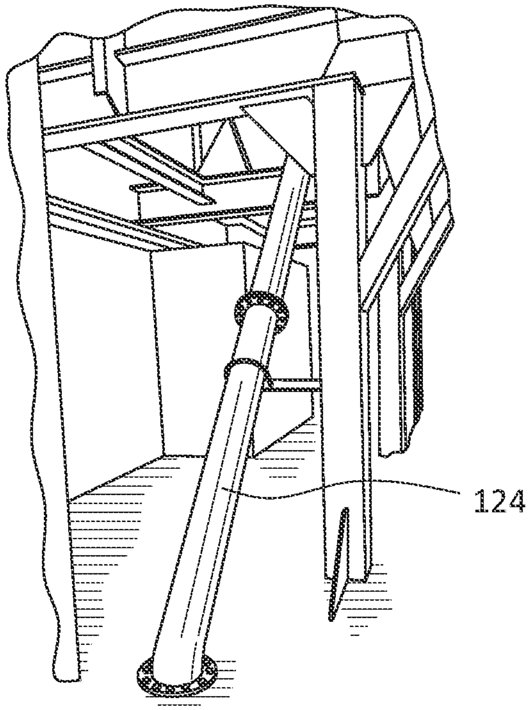
FIG. 3 is a perspective view of a pipe of an absorbent conveying system of the exhaust gas cleaning system of FIG. 1.

It will be appreciated that when loading of the absorbent from bulk storage is accomplished pneumatically, additional blowers and/or compressor may be utilized. If loading is done via gravity, then only a pipe is needed with or without aeration. If screw conveyors are utilized, a separate conveying system may be utilized. FIG. 3 shows an exemplary gravity type of loading through a pipe 124. Downwardly extending pipe 124 transports absorbent from a bulk storage tank to a dosing tank located vertically below the bulk storage tank.

Dosing Tank

Figure 4:
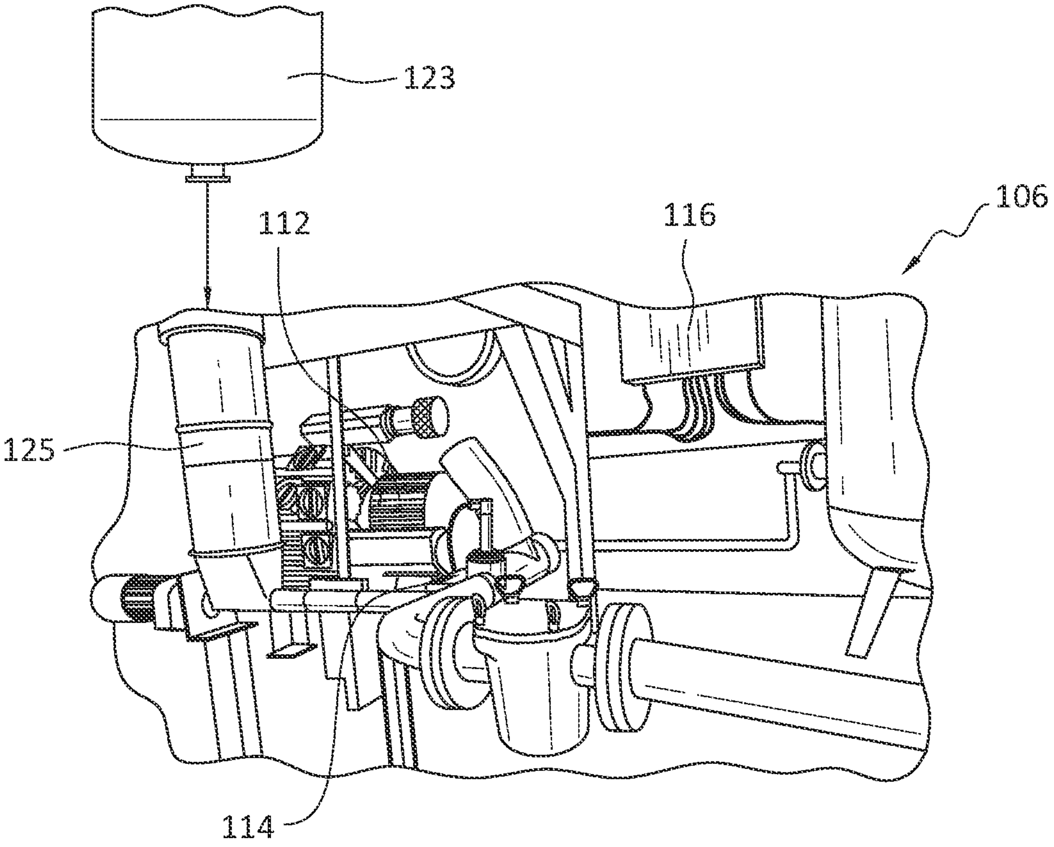
FIG. 4 is a perspective view of an exemplary dosing assembly in accordance with the invention.

Referring to FIG. 4, dosing assembly 106 of FIG. 1A includes a dosing tank or day tank 123 schematically shown directly above pipe 125, a blower and compressor 112, an injector assembly 114, and a control system 116. Dosing tank 123 receives the sodium bicarbonate from bulk storage tank 102 via absorbent conveying system 104 (e.g., via pipe 124 of FIG. 3). Blower 112 pneumatically transfers (e.g., via suction) the sodium bicarbonate from dosing tank 123, through pipe 125, to injector assembly 114. Injector assembly 114 injects absorbent into a pneumatic line. The absorbent is then injected by an injector into an exhaust line as described above and further discussed below with respect to FIGS. 6A-7. In certain embodiments, control system 116 is part of computing system 122 of FIG. 1B-2, is in operative communication with one or more controllers, sensors, and/or probes, and is configured to continually monitor $SO_x$ concentration in the exhaust gas of the engine, calculate the ratio of $SO_2$ to $CO_2$ or $CO_2$ to $SO_2$ to analyze the absorbent dosage needed, and control injection of the sodium bicarbonate accordingly. Control system 116, computing system 122, and system 100 may be configured as independent systems or as part of the same system.

In certain embodiments, dosing tank 123 is approximately 3 $m^3$ in size, fluidly coupled to and charged automatically from bulk storage tank 102, and fitted with an agitator, vibrator, and vibration air pads to ensure the free flow of absorbent from dosing tank 123 to the injector assembly 114 via, for example, a dosing auger. If the amount of absorbent in dosing tank 123 reaches a low level, then system 100 may be configured to sense a low-level alarm at dosing tank 123 from one of its sensors, and a conveying procedure from bulk storage tank 102 to dosing tank 123 may be automatically activated by system 100. To avoid absorbent flowing through the dosing screw, a lock may be implemented to ensure a constant and stable pressure of material on the dosing screw inlet. This ensures a positive volume of powder to the dosing screw and controls absorbent consumption. A strainer may be installed to avoid blockages that can be caused by caked absorbent.

In accordance with various embodiments of the invention, dosing tank 123 is configured with a maintenance hatch (e.g., DN500) at a side thereof, and fitted with a DN100, a vacuum unit with de-dusting filters, high/low level sensors, an agitator unit, and vibration air pads. Ventilation of dosing tank may utilize a DN125 filter. In other embodiments, dosing tank 123 includes a load cell weighing system that provides instantaneous readout of the absorbent mass in dosing tank 123, displays the unit weight and corresponding absorbent mass on relevant control screens, and provides measurement of absorbent consumption to system 100. The weighing system is factory calibrated and easily re-calibrated if necessary, in situ, by a TOP sensor which does not require a calibration weight. The weighting system may be set up with the following parameters of Table-3 below.

TABLE 3

| | |
|---|---|
| Load Cells | 4 × 1T (safe overload 150%, ultimate 300%) |
| IP Class: | IP66 |
| Working Temperature | −30 deg C. to 113 deg C. |
| Tilt and Heave Compensation | suitable for shipboard application |
| TOP Sensor | 1 × T2 (4-20 mA) |
| Local Display | LED screen |
| Process Unit | 1 |
| Mounting | 1 × stainless steel |
| Lift Off Prevention | 1 × for marine application |

In accordance with certain embodiments, dosing assembly 106 also comprises a service air compressor, an air dryer, and an oily water separator. The compressor is equipped with an integrated control system directly linked to system 100, utilizes approximately 7.5 kW of power, has a 500 liter buffer, and provides a warning when it senses insufficient air flow. The air compressor may include the following characteristics listed in Table-4 below.

TABLE 4

| | | |
|---|---|---|
| Compressor Capacity at Discharge | $m^3$/hr | 170 |
| Max Operating Pressure | bar | 8 |
| Sound Level | dB(a) | 73 |
| Dryer | dewpoint | −40 deg C. |
| Weight | kg | 700 |
| Voltage | v/ph/Hz | 400/3/50 |
| Protection | | IP55 |

Figure 5:
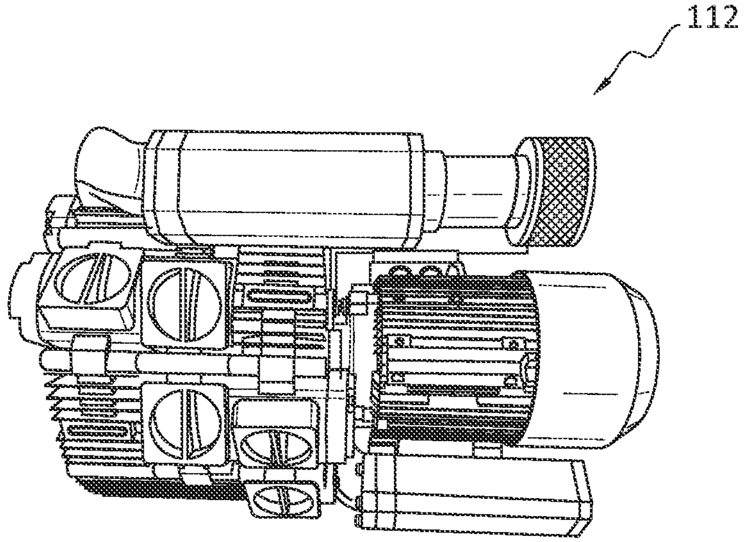
FIG. 5 is a perspective enlarged view of a blower of the dosing assembly of FIG. 4.

Dosing assembly 106 of system 100 utilizes blower 112 (FIG. 4) to create an aerosol spray comprising a mixture of the sodium bicarbonate from dosing/day tank 123 and air. An enlarged view of blower 112 is shown in FIG. 5. It will be appreciated that in certain embodiments, blower 112 may simply transfer the absorbent from the dosing/day tank 123 to injection piping via a continuous air stream, and directly into the exhaust uptake of the engine. Blower 112 is preferably a three-stage blower equipped to create high pressure and blow a large quantity of air under low pressure. In certain embodiments, an Induvac blower may be utilized: (https://www.induvac.com/en/vacuum-pumps/side-channel-blowers) in the systems and methodologies disclosed herein. Injector assembly 114 of dosing assembly 106 of system 100 as described herein is meant to refer to both injection of the absorbent into a pneumatic line and subsequent injection into an exhaust line. An exemplary injector 126 in accordance with the invention is shown and discussed with respect to FIGS. 6A-6D, and shown installed in fluid communication with exhaust pipes 115A, 115B of an engine of a ship in FIG. 7. It will be appreciated that the particular piping design utilized in conjunction with dosing assembly 106, and in particular, with injector assembly 114, may vary for each application/installation.

Injector

Figure 6A:
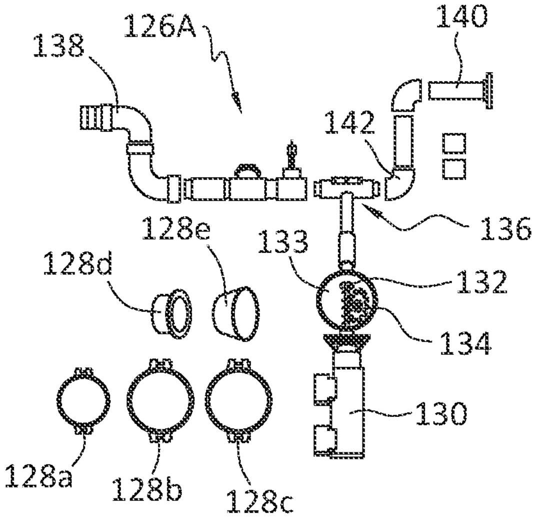
FIG. 6A is a disassembled view of a portion of an embodiment of an injector of a dosing assembly in accordance with the invention.

Referring to FIG. 6A, a disassembled view of a loading portion 126*a* of an injector 126 of injector assembly 114 includes mounting rings 128*a*, 128*b*, 128*c* and mounting parts 128*d*, 128*e* configured to mount loading portion 126*a* of injector 126, an electric motor 130, a screw gear 132 mechanically coupled to an agitating wheel 134 oriented at an approximately ninety degree angle relative to screw gear 132, a T-shaped portion 136 in the piping, a first piping end 138 fluidly coupled to a blower (e.g., blower 112), and a second piping end 140 fluidly coupled to an injecting portion 126*b* (FIG. 6B) of injector 126. Electric motor 130 turns screw gear 132, which extends toward but does not reach T-shaped portion 136. Cup 133, through which screw gear/auger 132 extends, is configured to receive any absorbent which undesirably locks up at bend 140 in piping and/or backflows through T-shaped portion 136.

One of the problems with transporting dry powder is that it does not always flow smoothly or properly due to bridging, arching, and rat-holing, whereby the dry powder jams up due to airlocks which form at or near turns or decreased cross sectional areas in the piping or other flow paths of the powder. Funnel effects occur in which powder flows freely in one area adjacent an outlet but stops around compacted powder. These effects may be caused by the forces of adhesion and interlocking geometry between the powder particles, capillary forces due to moisture in the product, and other forces. Electric motor 130, screw gear 132, and agitating wheel 134 (which engages and rotates with screw gear 132 powered by motor 130), are configured to agitate powder/absorbent flowing through loading portion 126*a* of injector 126. Motor 130 drives screw gear 132 and agitating wheel 134 to collectively agitate locked powder, break up any backflowing absorbent, and force it out through T-shaped portion 136 and through bend 142 toward second piping end 140.

In other words, backflow is created by overpressure from the blower that blows air from first piping end 138 to second piping end 140. When this air passes T-shaped portion 136, if it escapes through screw auger 132 toward dosing unit tank 123, this creates a force counter to the direction of powder flow. To avoid this, a plug of powder is created (e.g., an air lock) at approximately 10 mm before the end of T-shaped portion 136 opposite screw gear 132. Agitating wheel 134 avoids bridging and rat-holing above screw auger 132. The inventors have found that without agitating wheel 134, the powder stops collapsing down into screw auger 132, and no absorbent/powder is transported through screw gear 132 (i.e., without agitating wheel 134, no powder is pushed into the injection line).

Figure 6B:
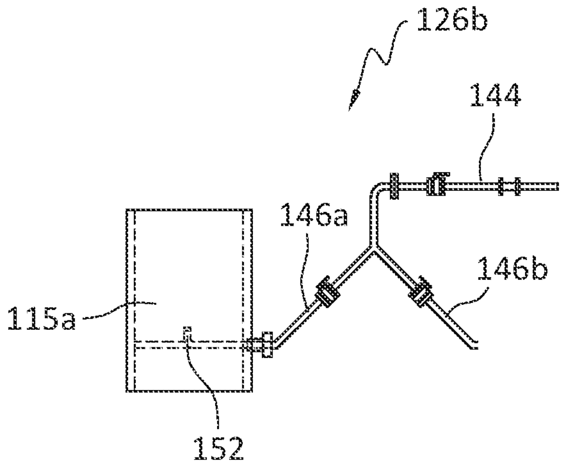
FIG. 6B is an assembled view of a connecting portion of an injector in accordance with the invention, which connects to the injector portion of FIG. 6A and to an exhaust pipe of a vessel's engine.
Figure 7:
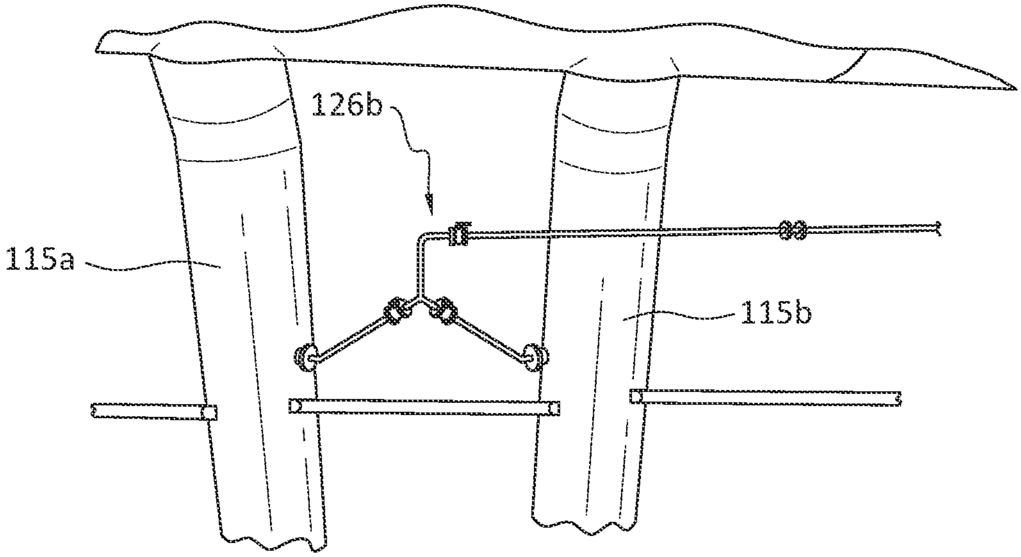
FIG. 7 is a perspective view of the embodiment of the injector of FIG. 6B, installed in fluid communication with two exhaust pipes of a vessel's engine.
Figures 8A, 8B, 8C, 8D:
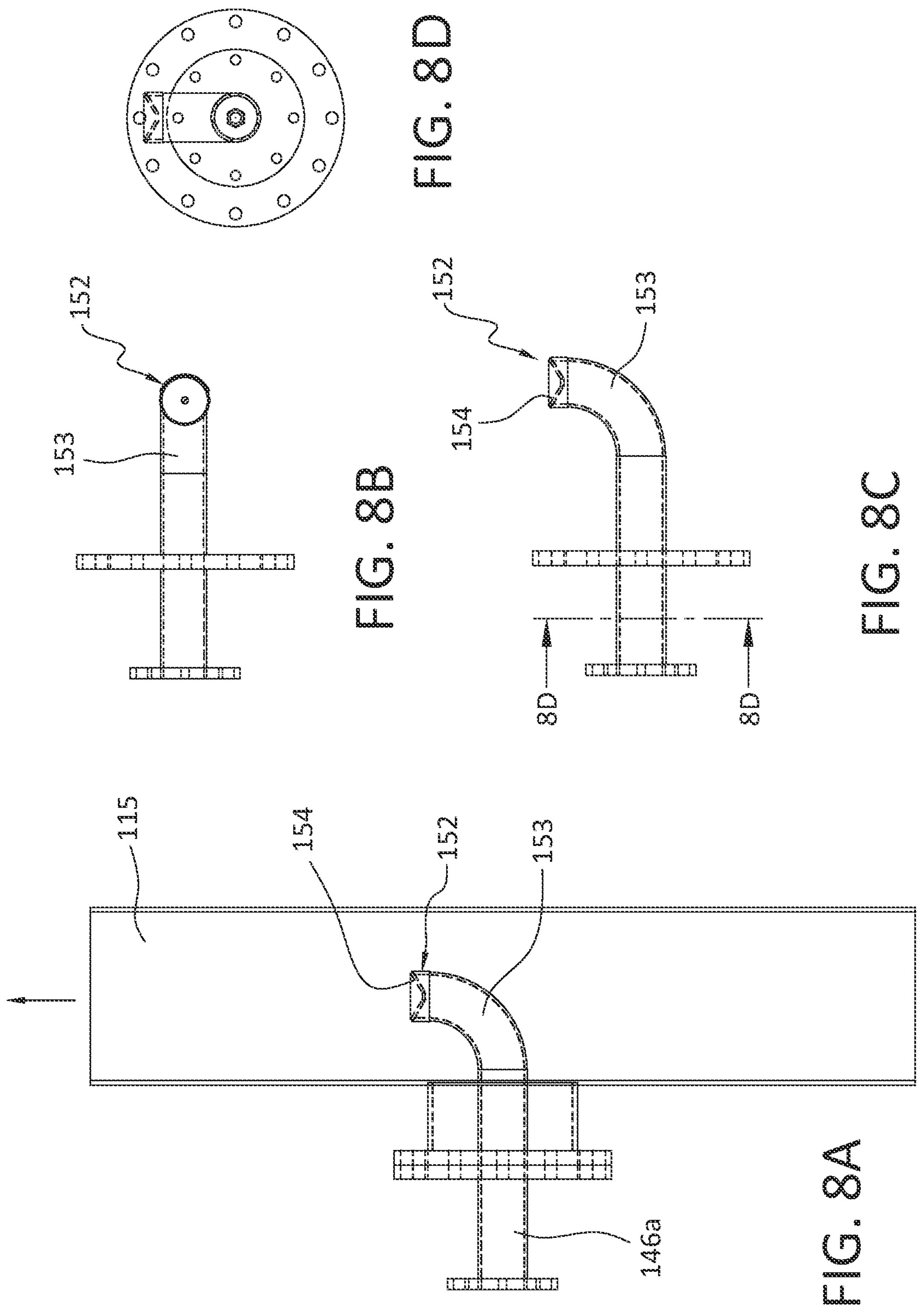
FIG. 8A is a side view of the injector nozzle of FIG. 6C mounted via mounting structure within and in fluid communication with a vessel engine's exhaust gas.
FIG. 8B is a top view of the mounting structure and injector nozzle of FIG. 8A.
FIG. 8C is a side view of the injector nozzle and mounting structure of FIG. 8A without attachment to the engine's gas exhaust.
FIG. 8D is a sectional view of FIG. 8C.
Figure 9B:
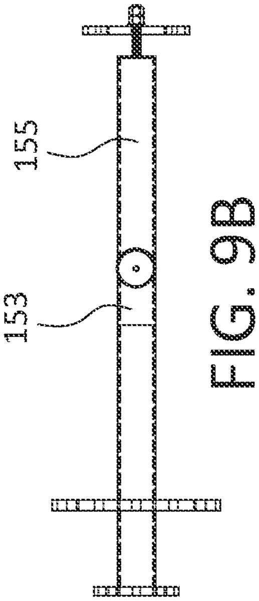
FIG. 9B is a top view of the injector nozzle, mounting structure, and stabilizer member of FIG. 9A.
Figure 9C:
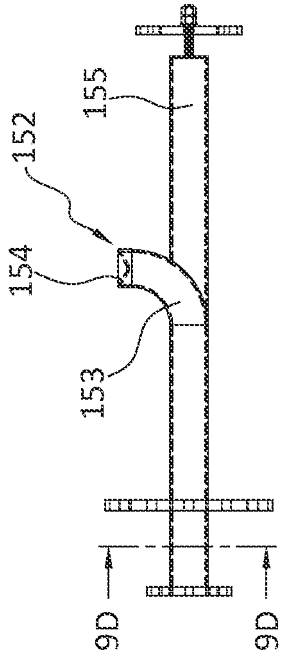
FIG. 9C is a side view of the injector nozzle, mounting structure, and stabilizer member of FIG. 9A without attachment to the engine's gas exhaust.
Figure 9D:
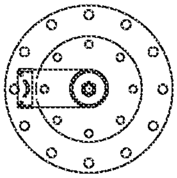
FIG. 9D is a sectional view of FIG. 9C.
Figure 9A:
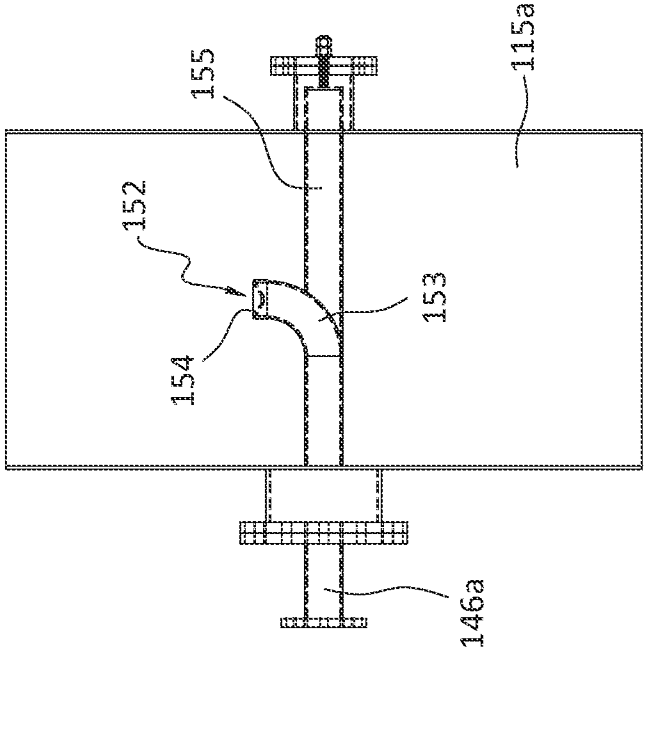
FIG. 9A is a side view of yet another embodiment of an injector nozzle of a dosing assembly, mounted to and in fluid communication with an engine having a large gas exhaust pipe, in conjunction with a stabilizer member.

Referring to FIG. 6B, an assembled view of an injecting portion 126*b* of injector 126 is shown. Injecting portion 126*b* includes pipe 144, which is fluidly coupled to second piping end 140 of loading portion 126*a* of injector 126, injecting pipe or conduit 146*a* configured to inject absorbent into exhaust line 115*a*, and injecting pipe or conduit 146*b* configured to inject absorbent into another exhaust line (not shown) which may be from the same engine. Injecting pipes 146*a*, 146*b* each inject absorbent through a unique nozzle 152 at respective ends thereof. As further discussed below, nozzle 152 has been developed to optimize dispersion of the absorbent within the exhaust gas.

Figure 6C:
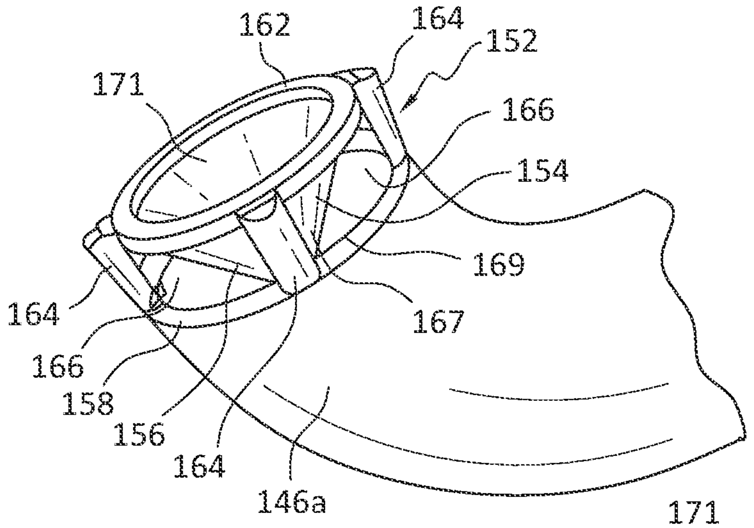
FIG. 6C is a side perspective view of a distal end of an injector nozzle in accordance with the invention.
Figure 6D:
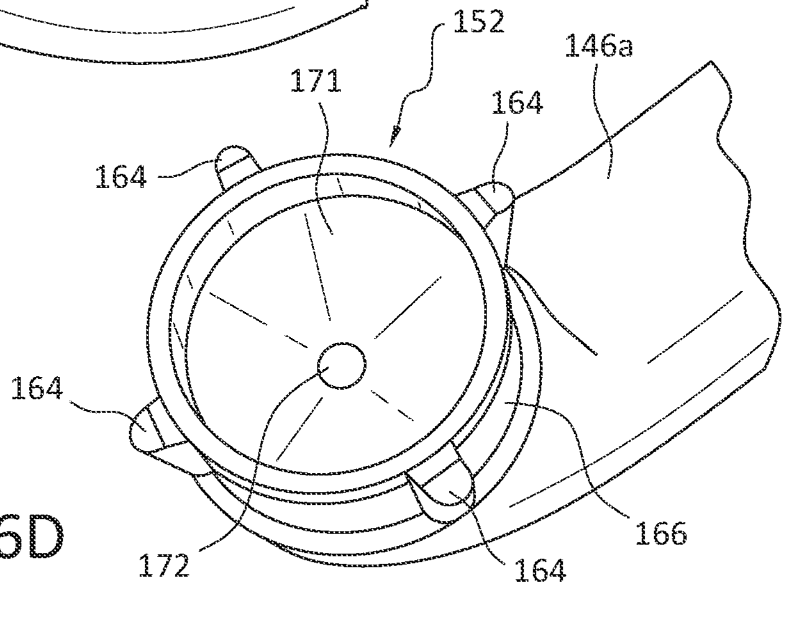
FIG. 6D is top perspective view of the distal end of the injector nozzle of FIG. 6C.

As shown in FIGS. 6C and 6D, nozzle 152 includes a conical (e.g., funnel-shaped) member 154 having a cone section 156 with a tapering end extending toward a distal end 158 of injecting pipe 146*a* of injector 126, and a ring-shaped peripheral edge/lip 162 at a relatively larger distal end thereof. A plurality of rods 164 are welded to and extend from distal end 158 of injecting pipe 146*a* to ring-shaped peripheral edge 162 of conical member 154, and thus support and mount conical member 154 to distal end 158 of injecting pipe 146*a*. As shown, conical member 154 and distal end 158 of injecting pipe 146*a* define an annular gap 166 around the circumference of cone section 156 and distal end 158 of injecting pipe 146*a*. It will be appreciated that due to the conical surface of cone section 156, the radial distance between exterior surface 167 of conical member 154 and the vertical projection of inner edge 169 of the inner sidewall of pipe 146*a* decreases in the distal (fluid moving) direction. Interior surface 171 of cone section 156 is solid except for a central hole 172 (FIG. 6D) defined by interior surface 171.

Thus, it will be appreciated that an absorbent and air mixture (hereafter, 'fluid') flowing through injector 126, upon reaching nozzle 152, will flow through both central hole 172 and annular gap 166 around the circumference of nozzle 152, where it will then be exposed to exhaust gas flowing in exhaust pipe 115*a*. It will also be appreciated that the fluid velocity will be fastest in the center due to the lack of friction in the center of pipe 146*a* and the relative small size of central hole 172. By contrast, the fluid closer to the inner sidewall of pipe/conduit 146*a* will experience more friction and move more slowly. Additionally, the fluid that is not aligned with small hole 172 will strike exterior surface 167 of cone section 156 and be guided upward and outward through annular gap 166, and/or bounce off of ring-shaped peripheral edge 162. Ring-shaped peripheral edge 162 of conical member 154 further disperses and biases the absorbent/air mixture radially outward. Thus, a large peripheral portion of absorbent is further radially dispersed by cone section 156 as it exists nozzle 152.

The inventors have found that this particular configuration of nozzle 152 provides the most optimum dispersion of absorbent into the exhaust gas, and immediately covers the entire cross-sectional area of the exhaust pipe 115*a* with absorbent. Additionally, pointing nozzle 152 in the direction of the flow of exhaust (FIG. 6B) allows for better lateral mixing because it is forced radially outward from the center by the nozzle. In other words, if the absorbent were instead sprayed through a nozzle pointed perpendicular to and directing the absorbent perpendicular to the flow of exhaust, then the exhaust, moving at high speeds, would create a wall of resistance that would be difficult for the absorbent to permeate. By placing nozzle 152 directly in the center of exhaust pipe 115*a*, aligning it with the direction of the exhaust, and providing both a circumferential annular flow of absorbent in a radial direction via annular gap 166 through which the absorbent is sprayed in all directions (360 degrees) and a central flow in the direction of exhaust through hole 172, optimal mixing is realized.

Directing the peripheral flow of absorbent powder radially outward three hundred and sixty (360) degrees through annular gap 166 and directing the central flow of absorbent powder axially through center hole 172 in the direction of the exhaust facilitates mixing across a larger cross-sectional area of exhaust pipe 115*a* than is achievable without cone section 156. In short, conical member 154 forces a large peripheral portion of the absorbent exiting nozzle 152 to radially outer portions of the exhaust flow that it would not otherwise reach without the conical member 152. In certain embodiments, central hole 172 may be in the range of approximately 12 mm+/− 10 mm in diameter, and annular gap 166 may extend for approximately 30 mm between distal end 158 of injecting pipe 146*a* and rim-shaped peripheral edge 162 of conical member 154.

As shown in FIGS. 8A-8D, nozzle 152 is preferably disposed in the center of exhaust pipe 115*a* and oriented in the direction of exhaust (schematically shown by the arrow A). Nozzle 152 is preferably made from boiler steel, and includes a flanged pipe with a 90-degree bend 153 pointed upward in the exhaust stream. Nozzle 152 may be used in conjunction with, for example, small diameter exhaust pipes (e.g., less than 600 mm), and is preferably placed as close to the turbocharger as possible as described above. As shown in FIGS. 9A-9D, nozzle 152 may also be used with larger diameter pipes (e.g., greater than 600 mm). In such larger pipes, a bracing member 155 may be utilized that connects to an opposite side of exhaust pipe 115*a* and provides lateral stability thereto.

In other embodiments, injector assembly 114 may include two injectors at opposite positions and oriented with tangential injection directions to provide further air/absorbent powder mixture and mixing with the ship's exhaust gas, thereby increasing abatement efficiency. In other words, two injectors may be positioned opposite one another, with each injecting an air/absorbent powder mixture tangentially into the exhaust gas. Given the highly turbulent flow patterns in the exhaust pipe of a ship from the main engine's turbocharger to the inlet of the composite boiler, it has been found that using a pair of location injection points opposite one another with tangential injection directions can be more efficient than a single injector (e.g., than a single injector that does not have the specialized nozzle described above), and can allow for more complete and timely mixing of the Sodium Bicarbonate with the exhaust gas. Since the finite chemical reaction times and the exhaust gas residence time (a function of exhaust gas velocity and the length of the exhaust pipe as discussed above) are fixed, it will be appreciated by those skilled in the art that efficient mixing at the moment of injection is of paramount importance.

Modular Dosing Tank

Figure 10A:
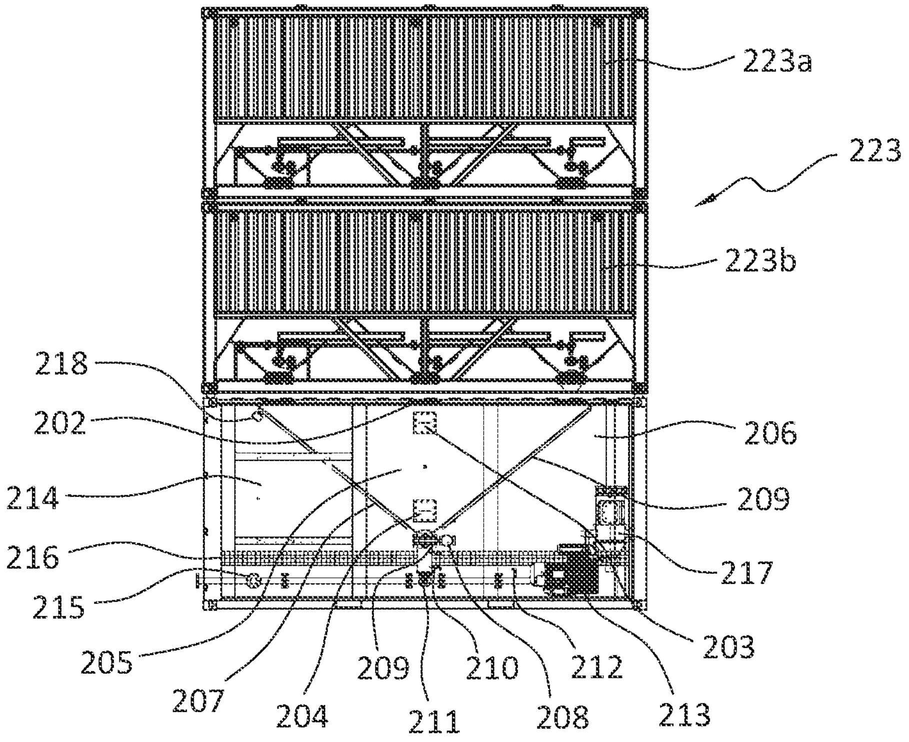
FIG. 10A is a front view of a stacked storage and dosing assembly in accordance with the invention, showing modular dosing tanks arranged in a stacked configuration on top of a dosing unit.
Figure 10B:
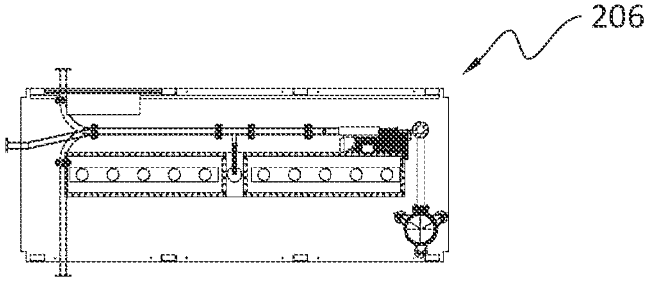
FIG. 10B is a top view of the dosing unit of the dosing assembly of FIG. 10A, without the stacked modular dosing tanks attached thereto.
Figure 10C:
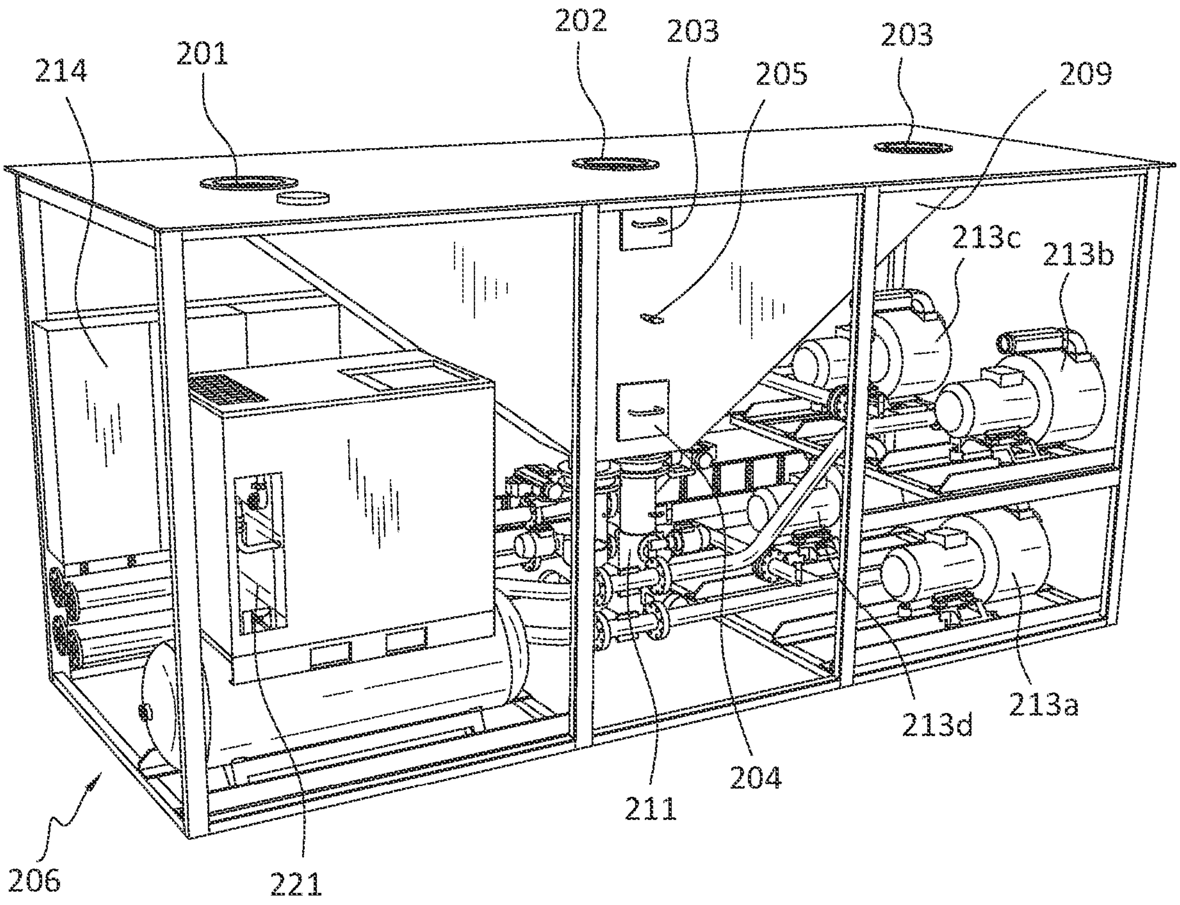
FIG. 10C is a perspective cutaway view of the dosing unit of the dosing assembly of FIG. 10A.

Referring to FIGS. 10A-10C, in certain embodiments, dosing tank 123 of dosing assembly 106 may instead be provided as a modular dosing tank 223 in which storage tanks/cartridges 223*a*, 223*b* are arranged in a stacked configuration on top of and operatively associated with a modular dosing unit/dosing assembly 206. Dosing unit 206 is best seen with reference to FIG. 10C. Modular dosing assembly 206 includes an inlet flange 202, upper inspection hole 203, lower inspection hole 204, low level switch 205, air slide 209, air inlet 207, rotary valve 208, high level switch 209, low level switch 210, screw auger 211, pressure transmitter 212, blowers 213*a*, 213*b*, 213*c*, 213*d* (FIG. 10C), control cabinet 214, injection outlet 215, cable tray 216, filter 217, safety valve 218, and compressor 221. Modular dosing tanks 223*a*, 223*b* and modular dosing unit 206 allow for easier replacement of the supply of absorbent and the other advantages described above. These components may all be lifted and fixed into a standard 20 ft container.

Modular dosing tank 223 may be integrated with and/or optionally supplement system 100, and used for automated processes described herein. When integrated in a vessel, the dosing system, conveying system and storage tank(s)/silo(s) described herein may be installed on-board. A void space is sourced inside or outside the vessel, and the equipment is sized to fit the vessel, bearing in mind the transport distance between main storage location(s) of the absorbent and the dosing tank, and minimizing energy requirements for the transport.

Modular dosing tank 223 with stacked containers 223*a*, 223*b* may be configured for easy placement (e.g., on a reefer spot as an example) on a container vessel, and may contain all needed machinery as listed above, including the dosing assembly 206, conveying system, DPS (Dust Prevention System), and the required dosing tank and automation system. The modular unit can be extended by placing additional standardized 20 ft storage containers on top of the process container, each with a capacity of 25 $m^3$ to 27 $m^3$, and connected with twist locks used during normal container transport operations. In certain embodiments, the storage containers may be configured to drop their content in the process container via three fall-through openings at the bottom of each unit fluidly coupled to openings 201, 202, 203 in the top of the modular dosing assembly unit 206 (FIG. 10C). The storage unit may also be configured to receive power and service air via a quick connection coupling from the process container. Such a configuration allows for easy placement onboard, provides flexibility and ease in adjusting the storage capacity to the vessel operations and trading pattern, and minimizes or eliminates interference of vessel operations during storage unit charging.

Compact containerized exhaust cleaning systems may also be utilized that can be easily placed on-board with limited storage capacity inside a 20 ft seaworthy container. In such embodiments, the container may include the conveying and dosing system, an integrated storage of 10 $m^3$, an automation system, dosing tank, and an IDPS (integrated Dust Prevention System). The unit need only be connected to the engine exhaust line (e.g., by a 3"/DN80 pipe from the compact unit to the exhaust line) to inject the absorbent straight after the turbochargers of one or more engines of the vessel. A power and communication connection may be utilized to foresee and analyze the required input from the engine and exhaust, and the power required to run the machinery. This allows for minimal storage space and external connections, integrated load, dust prevention, and conveying system integration, which can be used for a bridging period. Such a compact system is easy to place on board smaller vessels without interruption of operations, and uses a small number of piping or external connections.

Figure 10D:
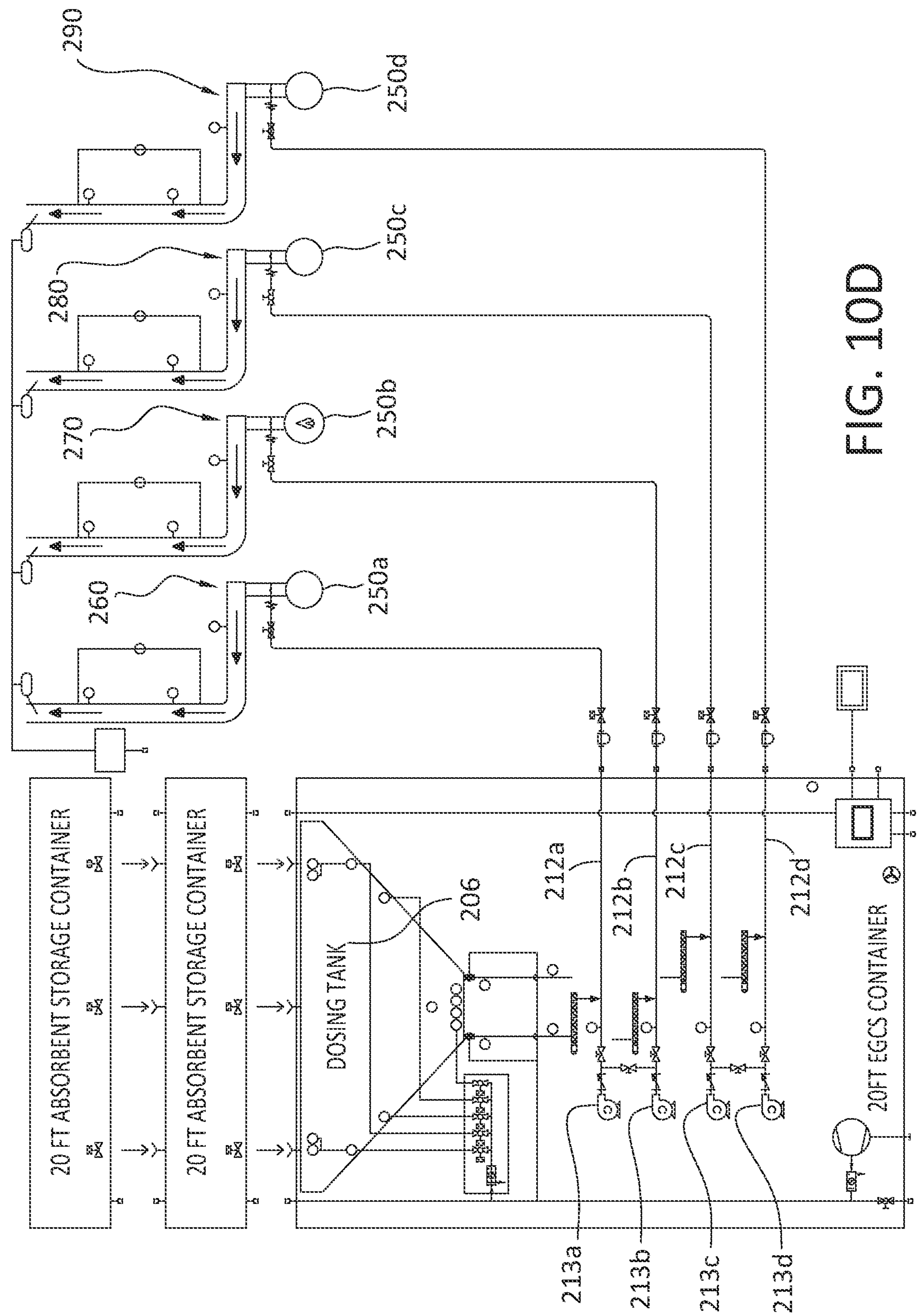
FIG. 10D is a schematic diagram of the dosing assembly of FIG. 10A.

Referring to the schematic of FIG. 10D, modular dosing tank/unit 206 can be placed in operative association with the exhaust of four different engines 260, 270, 280, 290. Blowers 213*a*, 213*b*, 213*c*, 213*d* drive absorbent from modular dosing tank 206 along respective lines 212*a*, 212*b*, 212*c*, 212*d* to the four different exhausts 260, 270, 280, 290. The absorbent is then injected at or adjacent turbochargers 250*a*, 250*b*, 250*c*, 250*d*, similar to the parallel injection described above with respect to FIG. 1B-2.

Figure 11:
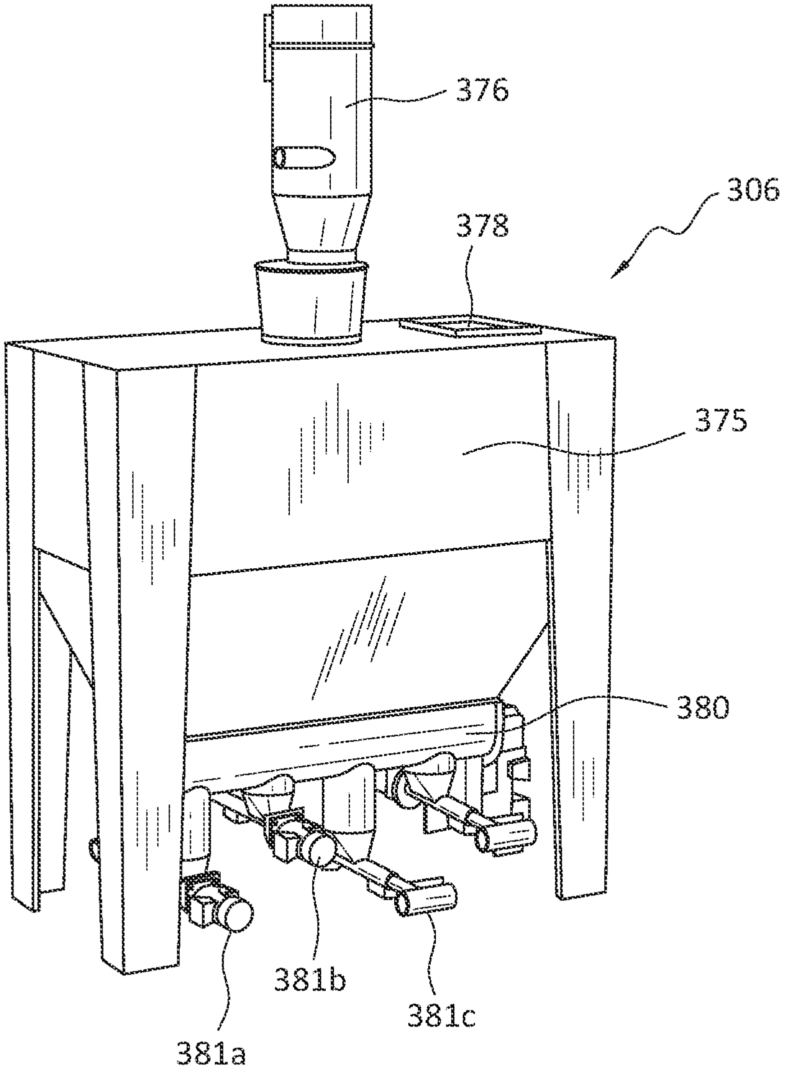
FIG. 11 is a perspective view of an alternative storage and dosing assembly in accordance with the invention.

Referring to FIG. 11, in yet another embodiment, a modular dosing assembly 306 is provided which also allows for treating two to four engines at once, and which contains an integrated and fully demountable bunker 375 for storing absorbent. Modular dosing assembly 306 further includes an optional vacuum conveyor 376, a manhole 378, an agitator 380, and four dosing screw augers 381*a*, 381*b*, 381*c*, 381*d*. Modular dosing assembly 306 may be used in conjunction with a bulk storage tank (102, 102*a*), receive absorbant via vacuum conveyor 376, stage the absorbent in bunker 375, and treat multiple engines at once.

Dosing Assembly Control System

In certain embodiments, control system 116 of dosing assembly 106 may include the following components and sensors of Table-5 in accordance with embodiments of the invention.

TABLE 5

| Instrument | P&ID Location | Range |
|---|---|---|
| Press diff transmitter | PIT-0107 | 0-1 Bar |
| Automated valve | 02-07 | Fully open/closed |
| Temperature sensors | PIT-0107 | 0-500 degrees C. |
| High level MTC sensor | 03-02 | Open/Close |
| Low level MTC sensor | 03-05 | Open/Close |
| Empty level MTC sensor | 03-06 | Open/Close |
| Day tank high level sensor | 02-09 | Open/Close |
| Day tank low level sensor | 02-10 | Open/Close |
| Day tank continues level sensor | 02-08 | 0-100% |
| Pressure sensor | 02-19 | 0-10 Bar |

In other embodiments, control system 116 automatically records when system 100 is in use, the exhaust gas pressure before and the pressure drop across system 100, the fuel oil combustion equipment load, and the exhaust gas temperature. These readings/values may be recorded in control logs as read-only with encryption. Various data recording and processing devices may be employed to record data associated with the ship's position, obtained from, for example, the ship's global navigation satellite system (GNSS). $SO_2$(ppm) and $CO_2$(%) may be continuously monitored and recorded in a data recording and processing device at a rate not less than 0.0035 Hz.

In yet other embodiments, system 100 may be configured to operate in accordance with the following operating conditions of Tables 6-7 below. Other configurations may be utilized depending on the particular application.

TABLE 6

| Parameter | Unit | Maximum | Minimum |
|---|---|---|---|
| Engine load MCR | % | 100 | 0 |
| Power | KW | 13.090 | 0 |
| Exhaust gas flow rate | Kg/hr | 3985 | nac |
| Fuel oil sulphur content | % m/m | 3.5 | nac |
| Exhaust gas diff pressure across scrubber | mm H2O | 400 | 0 |
| Engine load MCR | % | 100 | 0 |
| Power | KW | 800 | 0 |
| Exhaust gas flow rate | Kg/hr | 3580 | nac |
| Fuel oil sulphur content | % m/m | 3.5 | nac |
| Exhaust gas diff pressure across scrubber | mm $H_2O$ | 400 | 0 |
| Engine load MCR | % | 100 | 0 |
| Power | KW | 1500 | 0 |
| Exhaust gas flow rate | Kg/hr | 6720 | nac |
| Fuel oil sulphur content | % m/m | 3.5 | nac |
| Exhaust gas diff pressure across scrubber | mm $H_2O$ | 400 | 0 |

TABLE 7

| Details: | |
|---|---|
| Injection Rate | 0-6.5 kg/min |
| Bulk Density | 0.75-1.2 t/m$^3$ |
| Fineness (Blaine) | 3,288 to 4,000 cm$^2$/gram: |
| Particle Size | 95% passing 40 μm |
| Maximum allowed back pressure | 750 mbar (g) |
| Maximum injection Pipe System Back Pressure | 1 bar(g) |
| Maximum length from Dosing Unit | 50 meters |
| Maximum number of bends after Dosing Unit | 3 |
| Electrical Power Requirements | 30 kW normal operation, 35 kW max |
| Blower Noise Level | <70 dB |

Control system 116 of dosing assembly 106 of exhaust gas cleaning system 100 may include one or more computing systems with one or more servers, one or more processors, a plurality of peripheral remote user computing devices, a personal PC, as well as one or more third party APIs in communication with the server(s) via a network for use with exemplary embodiments of the invention. As described above, a combination of hardware and software may operate on these computing devices, with one or more connections to wired or wireless network (e.g., a wide area network (WAN) such as the Internet, a cloud-based network, etc), incorporated with local devices through a local area network (LAN) interface (not shown), and/or through or in conjunction with any future technologies for communicating data.

Control system 116 may be pre-calibrated, for example, with main engine load curve characteristics of a particular vessel, and may be configured to self-adjust based on system requirements. Control system 116 receives inputs from the engine fuel rack and a continuous emission measurement system (CEMS) to provide optimum dosing at all times. By way of example, gas analyzer 118 (FIG. 1B-2) may communicate the ratio and Sulphur values to control system 116. Depending on the geographical area where a vessel is sailing (e.g., inside or outside SECA), control system 116 may be configured to inject a certain amount or range of sodium bicarbonate into the exhaust.

In certain embodiments, control system 116 may be configured to start with a high dose, and reductions may be made thereafter. Once an acceptable Sulphur ratio is reached, control system 116 can be configured to inject less sodium bicarbonate until Sulphur levels remain stable below the acceptable level, and in certain embodiments, just below the acceptable level as described above. Sulphur levels may be monitored every second if necessary, and the injection speed and/or volume may be modified/adjusted as needed. In certain embodiments, in order to avoid overdosing or exaggerated fluctuations, a specific range may be provided per vessel, and preset in one or more databases of system 100. Such optimum dosing and self-adjustment allow system 100 to operate automatically/autonomously while continually logging and capturing data. System 100 may also allow for remote monitoring using an optional installable SIM card (accessible when in range of a cellular network).

Control system 116 may also include, for example, a sample probe fitted at the top of a funnel to continuously sample exhaust gas discharged to the atmosphere. The sampled gasses may be conveyed via a heated line to a measuring cabinet located on a port side of the incinerator deck. $SO_x$ readings for engine exhaust may be taken, for example, within a 0.0035 Hz sample frequency outlined by the IMO. The readings may be fed to control system 116 and used to control and meter the required amount of absorbent injected into the main engine exhaust.

Control system 116 may utilize various graphical user interfaces and touchscreens to access information and operate various components of system 100, and can be configured to produce various graphical user interfaces for accessing information about system 100, its operation, and the various parameters associated with the ship's operation, exhaust, and chemical reactions during use. In system 100 can be configured to display for the user, via control system 116, representations of storage tank 102, dosing tank 123, one or more dosing screws, and gas analyzer and fuel rack sensor/probe values. GPS coordinates and equipment speeds at all levels may also be displayed. Automatic programs configured to control the various systems and methodologies described herein may also be switched to manual feeding if necessary or desired.

Sodium Bicarbonate Origin, Injection, and Chemical Reactions

As discussed above, when dosing unit 106 of system 100 injects sodium bicarbonate ($NaHCO_3$) in powder form into the exhaust of a ship, it neutralizes $SO_x$ pollutants. In the systems and methods described herein, the sodium bicarbonate utilized can be sourced synthetically using the Solvay™ or an ammonia-soda process, or mined from natural deposits of Trona and Nahcolite. The Solvay™ process is a manufacturing method that heats limestone to produce calcium oxide and carbon dioxide. The carbon dioxide is then placed in a solution of ammonia in a salt brine. This generates an ammonia bicarbonate effluent. Sodium bicarbonate is then isolated through a filtering process.

The sodium bicarbonate can also be mined, primarily from two naturally occurring compounds: Trona and Nahcolite. Both of these minerals are abundant in the USA, Turkey, Botswana, and Kenya. Trona is a sodium carbonate compound that can be used to produce sodium bicarbonate, and Nahcolite is a natural mineral that has an identical composition to sodium hydrogen carbonate. Natural deposits of Trona and Nahcolite provide an environmentally friendly alternative to the Solvay process, but require further processing to be used for exhaust gas cleaning.

The initial step in the absorption process is the thermal decomposition of the sodium bicarbonate to produce sodium carbonate, carbon dioxide, and water. The initial temperature at which this decomposition occurs is 80° C., which is easily achieved in the exhaust gas stream of a marine engine or boiler:

$$2NaHCO_3 \rightarrow Na_2CO_3 + CO_2 + H_2O$$

This reaction is crucial for $SO_x$ abatement as the product yielded from this decomposition—sodium carbonate—in turn reacts with sulphur oxides, producing sodium sulphate and sulphite. Sodium carbonate is strongly alkaline in nature, and when combined with acidic flue gas, it produces a neutral sodium salt (pH 7) and carbon dioxide. The two reactions are as follows:

$$Na_2CO_3 + SO_2 \rightarrow Na_2SO_3 + CO_2$$

$$Na_2CO_3 + SO_3 \rightarrow Na_2SO_4 + CO_2$$

These non-toxic salts may be collected in particulate capture system 108 of system 100 and treated for safe disposal.

During the combustion process, sulphur is oxidized into sulphur oxides ($SO_x$), which is a collective term for sulphur dioxide ($SO_2$) and sulphur trioxide ($SO_3$). The major constituent is sulphur dioxide. Sulphur trioxide forms to a much lesser extent (e.g., 1-3% of $SO_x$ in boilers and 2-5% of $SO_x$ in engines). While sodium sulphite is formed, the sulphite is further oxidized by free oxygen present in the flue exhaust gas. The main salt produced is thus sodium sulphate:

$$2Na_2SO_3 + O_2 \rightarrow 2Na_2SO_4$$

Naturally, sodium bicarbonate is hygroscopic and soluble in water. If mixed with water, carbonic acid forms that readily decomposes to carbon dioxide. Carbonic acid is not hazardous, but can possibly cause minor degradation of the bicarbonate product. This may lead to less efficient reactant. However, with the addition of an additive such as, for example, a Solvay formulation under the name of Solvair S350, the bicarbonate repels moisture. This increases the stability of the product in storage, reducing its tendency to 'cake.' Other products may be utilized.

Bicarbonate is subjected to 'caking' through exposure to non-ideal conditions of excess heat (60° C.) or moisture (relative humidity in excess of 70%). In certain embodiments, system 100 may employ a dry air blanket and other measures to mitigate caking. The blanket prevents the sodium bicarbonate from picking up additional moisture in storage, and an anti-caking agent that induces the hydrophobicity and maintains the free-flow properties of the product.

With respect to corrosion, sodium sulphate is a neutral salt with a pH of 7 in aqueous solutions. During the absorption reaction, the pH shifts from acidic to alkaline conditions (exhaust systems are built to withstand a pH of 1-3). As the milled particles are very small (20 microns), they will not accumulate in the flue gas—hence no corrosion. Sulphate-induced hot corrosion happens due to alkaline sulphate deposits damaging components in the exhaust system. There are two types. Type I initiates between 800-950° C., and thus is not applicable as the bicarbonate is injected at much lower temperatures downstream. Type II occurs when there is a sufficient $SO_3$ supply, which further reacts with the sodium sulphate. $SO_3$ is minimal and present at the end of the flue, so both types of corrosion are extremely unlikely.

The ideal residence time for the reaction in the exhaust is 1-2 seconds. Since dosing assembly 106 of system 100 injects sodium bicarbonate into the exhaust stream directly after the turbocharger, the reaction commences immediately, is positively affected by higher temperatures, and as the temperature rises, the reaction rate also rises. Typical exhaust gas temperatures post turbocharger are within a range of 225° C.-245° C., which provides optimal temperature conditions for this reaction.

Regarding the health, safety, social and environmental (HSSE) implications of system 100, as described above, sodium sulphate is a naturally occurring benign salt. It is soluble in water and forms a pH neutral solution in aqueous conditions. It is safe and harmless for humans, aquatic organisms, and the environment. Sodium sulphate is extremely stable until exposed to extremely high temperatures (>884° C.) when it gradually decomposes into hazardous products. Toxic fumes of sulphur oxides are liberated as well as corrosive sodium oxide. The reagents and products described herein (sodium bicarbonate, sodium carbonate, and sodium sulphate) are non-flammable, non-combustible, and non-explosive.

Regarding whether to use milled or unmilled sodium bicarbonate, it should be noted that unprocessed sodium bicarbonate is not the optimal particle size for the absorption process, as it does not have adequate active surface area for sufficient $SO_x$ removal. System 100 utilizes absorbent that is milled to the ideal specification that increases the active surface area and increases $SO_x$ absorption.

As described above, many ocean vessels utilize an open loop (wet) scrubber that is installed to treat exhaust by removing sulphur from flue gasses. With this open loop type scrubber, acidic water is pumped directly overboard into the ocean. At open sea, this does not create an issue. However, this open loop type of system will soon be banned from certain seas and ports due to the emission of acidic water. In certain embodiments, the dry desulphurisation technologies disclosed herein (e.g., system 100 and various components thereof) may be added to to a conventional open loop wet scrubber. In this manner, an ocean vessel can use a wet scrubber at open sea when there are no restrictions, but upon entering ports or seas where the open loop scrubber is banned, the ocean vessel can switch to using system 100 for desulphurisation of the engine exhaust, and continue to run on high sulphur fuel. In short, system 100 can simply be added to a wet scrubber exhaust system without any special features.

By way of example, there are two types of wet scrubbers—inline and U type. When using an inline wet scrubber, no by-pass or valve would need to be installed. The absorbent would simply pass through the wet scrubber and discharge at the exhaust outlet as usual. When using a U-type scrubber, a three-way valve may be installed to direct the flue exhaust gas either through the wet scrubber or a by-pass for dry desulphurisation using one or more components of system 100. Such a system would thus have two separate outlets for exhaust—one for using the wet scrubber and one for using the dry scrubber.

Particulate Capture System

Particulate capture system 108 of FIG. 1A may be configured with a cyclone-based particle capture device designed and optimized for marine environments, and may include two parallel cyclones, an intermediate hopper, a storage container/silo, a compressor, and automated control functionality. The exhaust gasses, including fine dust, enter particulate capture system 108 directly from the original exhaust gas piping system as shown in FIG. 1A. As a result of the pressure drop in combination with centrifugal forces (i.e., radially outward momentum of particulate due to the cyclone), the dust particles are separated from the exhaust gasses, and captured and stored in the intermediate hopper. Once the hopper is full, the particulate particles can either be guided into a separate storage container by gravity or pneumatically conveyed from the hopper to a storage container/silo.

Such storage can be discharged pneumatically to a truck (e.g., the same truck that supplies new absorbent to the vessel), or exchanged with an empty storage container during normal and regular vessel operations. Notably, optimizing particulate capture system 108 does not require cooling down the exhaust gasses before entry thereof. Additionally, particulate capture system 108 takes out not only fine dust, but also, particles such as soot and the like. The size of particulate capture system 108 can be adjusted, and depends on the particular application (e.g., vessel type, engine type, and exhaust line diameter).

It will be appreciated that the various embodiments of system 100 and its components illustrated and described herein may be used for a variety of processes to monitor and maintain sufficient and optimum dosing of sodium bicarbonate in powdered form in a ship's exhaust during operation to neutralize Sulphur components therein by the various chemical reactions described herein. During operation, system 100 can control absorbent conveying system 104 to transfer absorbent from one or more bulk storage tanks 102 to one or more dosing tanks 123 via pneumatic conveyance in one or more conveyors using one or more blowers or vacuum pumps described above. Dosing tank 123 receives the sodium bicarbonate from bulk storage tank 102, and system 110 controls blower 112 to pneumatically transfers the sodium bicarbonate from dosing tank 123 to injector assembly 114 of dosing assembly 106.

Control system 116 of dosing assembly 106 may be configured to continually monitor, output, and record, via one or more sensors, probes, and controllers, the Sulphur concentration in the exhaust of the engine during operation, the current amount of sodium bicarbonate (e.g., the weight) stored/staged in dosing tank 123 and/or injector assembly 114, the temperature and pressure within absorbent conveying system 104 and dosing assembly 106, and within any other component of system 100.

System 100, based on signals outputted from control system 116, and one or more other variables sensed or communicated (e.g., the ship's current location as indicated by GPS coordinates or other location identifier, preprogrammed acceptable sulfur ranges associated with various geographic locations, temperature and pressure within the system, calculated absorption rates, time of reactions, injection locations, etc.) may be configured to operate dosing assembly 106 to administer a controlled injection amount of sodium bicarbonate into the engine exhaust at one or more locations to bring the level of $SO_x$ concentration in the exhaust gas of the engine to, or maintain it within, acceptable standards. It will be appreciated that the amount of sodium bicarbonate injected may increase or decrease depending on the measured data and system programming, and that while the primary objective is to maintain Sulphur contaminates at low levels, in certain embodiments, system 100 may be configured to inject the minimal amount of absorbent needed to maintain such acceptable levels.

In certain embodiments, control system 116 may be pre-calibrated, for example, with main engine load curve characteristics of a particular vessel, and configured to self-adjust based on machine learning and system requirements. For example, over the course of particular shipping routes, at particular ship speeds, in particular locations, and during particular types of weather, patterns may develop indicative of a general range of sodium bicarbonate needed at particular locations and/or during particular times. As described above, control system 116 and/or computing system 122 may also receive inputs from the engine fuel rack, gas analyzer 118, and a continuous emission measurement system (CEMS) to help provide optimum dosing at all times. Control system 116 of the dosing unit may be equipped with its own controller, and configured to operate independently of system 100 or computing system 122, with or without override by system 100 and/or computing system 122. Manual overrides at all system locations may also be implemented. System 100 may also display status information for users at various terminals, and, via one or more user interfaces, allow for manual control of all mechanical, computing, and operative components of system 100. Following injection of the sodium bicarbonate and the subsequent reactions, the inert salts and other particulates may be captured by particulate capture system 108 for later disposal.

The present invention can be employed within or by a multitude of electronic devices, smart phones, tablets, computers, televisions, displays, voice recognition devices/technologies, and other such types of electronic devices. The digital content of these devices may include audio-visual content, audio content alone, video content alone, still images, audio files, and the like. The digital content may be presented in different forms, whether historical, live (real-time), downloaded, online, streamed, etc. The invention pertains to computer software and systems that carry out the various processes described herein.

It will be understood that the above-described embodiments and arrangements are merely illustrative of the many possible specific embodiments that represent applications of the present invention, and that numerous and varied other arrangements and configurations can be readily devised without departing from the spirit and scope of the invention and equivalents thereof.

It will be appreciated that various modules of the systems, platforms, and methods described herein may be implemented by using an interfacing mobile app on an internet enabled mobile device's operating system, such as, for example, Android, iOS, or Windows Phone OS, and in part by using a web interface, and that different types of users may utilize different functionalities. Systems described herein may include implementations through a combination of hardware and software that operate on a stationary or portable computing device, and may comprise various pre-programmed features combined and integrated with basic components, including but not limited to, one or more servers, databases, mobile end applications, web portals, network settings, etc. With the support of these components, the system provides the services and functionalities through user interfaces such as a website or mobile applications.

It will be understood that the above-described embodiments and arrangements are merely illustrative of the many possible specific embodiments that represent applications of the present invention, and that numerous and varied other arrangements and configurations can be readily devised without departing from the spirit and scope of the invention and equivalents thereof.

What is claimed is:

1. A system for treating exhaust gas of a vessel having at least one engine equipped with a turbocharger, the system comprising:

a storage tank configured to store a powder for treating the exhaust gas;

a dosing assembly fluidly coupled to the storage tank and configured to inject the powder into the exhaust gas at or adjacent the turbocharger;

a gas analyzer including one or more probes configured to communicate data associated with a sulfur measurement in the exhaust gas; and a computing device configured to receive the data from the gas analyzer and determine an adjustment to a metering amount of the dry powder injected into the exhaust gas;

wherein the computing device determines the adjustment based on both the data from the gas analyzer and real-time data associated with an amount of fuel injected into the engine.

2. The system of claim 1, wherein the dosing assembly is configured to inject the powder into the exhaust gas within fifteen meters of the turbocharger.

3. The system of claim 1, wherein the exhaust gas includes main exhaust gas from a main engine and auxiliary exhaust gas from one or more auxiliary engines, and wherein the dosing assembly is fluidly coupled to a plurality of exhaust pipelines that carry the main exhaust gas and the auxiliary exhaust gas.

4. The system of claim 3, wherein the dosing assembly includes a dosing tank fluidly coupled to the storage tank, and a plurality of injectors fluidly coupled to the dosing tank and configured to inject powder from the dosing tank into the main exhaust gas from the main engine and the auxiliary exhaust gas from the one or more auxiliary engines.

5. The system of claim 1, wherein the dosing assembly includes an injector having a first portion and a second portion, the first portion including a motor, an agitating wheel, and a screw gear mechanically coupled to one another, the second portion having an injecting pipe for injecting the powder into the exhaust gas at or adjacent the turbocharger, wherein the first portion and second portion are fluidly coupled to one another and the agitating wheel is configured to agitate the powder as it flows through the first portion.

6. The system of claim 5, wherein the agitating wheel is oriented at an approximately ninety degree angle relative to the screw gear, the motor rotatably drives the screw gear, and the screw gear rotatably drives the agitating wheel.

7. The system of claim 5, wherein the second portion of the injector includes a nozzle defining a central hole and an annular peripheral gap, and the nozzle is configured to guide the powder through the central hole and the annular peripheral gap.

8. The system of claim 1, wherein the storage tank is a vertical silo.

9. A nozzle for injecting a powder into exhaust gas of an engine of a vessel, comprising:

a conduit configured to transport the powder; and a conical member mounted to a distal end of the conduit and defining a central hole in fluid communication with the conduit for guiding a first portion of the powder through the central hole, wherein the distal end of the conduit and the conical member together define an annular gap configured to guide a second portion of the powder through the annular gap.

10. The nozzle of claim 9, wherein the conical member is cone-shaped and configured to guide the second portion of the powder radially outward through the annular gap.

11. The nozzle of claim 10, wherein the conical member increases in diameter between a tip portion within the distal end of the conduit and an opposite end offset from the distal end of the conduit.

12. The nozzle of claim 11, wherein the opposite end of the conical member includes a ring-shaped peripheral lip configured to further direct the second portion of the powder radially outward through the annular gap.

13. The nozzle of claim 12, further comprising a plurality of rods mounted to the distal end of the conduit and the ring-shaped peripheral lip of the conical member.

14. The nozzle of claim 13, wherein the plurality of rods consist of four rods spaced ninety degrees apart from one another around the circumference of the ring-shaped peripheral lip of the conical member.

15. The nozzle of claim 9, wherein the conical member has a funnel-shaped interior surface between a tapered end within the distal end of the conduit and an opposite end offset from the distal end of the conduit, the funnel-shaped interior surface defines an cone-shaped interior space, and the first portion of the powder passing through the central hole is guided radially outward by the funnel-shaped interior surface and toward the opposite end.

16. The nozzle of claim 9, wherein the powder is sodium bicarbonate.

17. The nozzle of claim 9, wherein the nozzle is mounted within a center region of an exhaust pipe carrying the exhaust gas of the engine of the vessel, and oriented with the central hole aligned with a direction of flow of the exhaust gas.

18. A dosing assembly for treating an exhaust gas of an engine of a vessel with a powder, comprising:

a bottom dosing unit containing one or more blowers configured to fluidly couple to one or more flow lines;

a plurality of storage containers stacked on top of the bottom dosing unit and configured to store the powder, wherein the plurality of storage containers are in selective fluid communication with the bottom dosing unit, and the bottom dosing unit is configured to meter out doses of the powder for injection into the exhaust gas of the engine.

19. The dosing assembly of claim 18, wherein the one or more flow lines include a main flow line fluidly coupled to a main exhaust line carrying main exhaust of a main engine of the vessel, and at least one auxiliary flow line fluidly coupled to at least one auxiliary exhaust line carrying auxiliary exhaust of at least one auxiliary engine of the vessel.

20. The dosing assembly of claim 19, further comprising:

a computing device configured to determine, for each of the main exhaust line and the at least one auxiliary flow line, a corresponding metering dose of the powder.

21. The dosing assembly of claim 20, wherein the computing device determines the corresponding metering dose of powder for each of the main exhaust line and the at least one auxiliary flow line based on real-time data associated with a sulfur content of the main exhaust or the auxiliary exhaust.

22. A dosing assembly for treating an exhaust gas of a vessel with a powder, comprising:

a dosing tank for storing the powder;

an agitating tank for agitating the powder;

a plurality of dosing screw augers configured to dispense the powder to a plurality of flow lines fluidly coupled to exhaust gas of a plurality of engines of the vessel; and a computing device configured to determine, for each of the plurality of flow lines, a corresponding metering dose of the powder.

23. A system for treating exhaust gas of a vessel having at least two engines respectively equipped with a turbocharger, wherein the exhaust gas includes main exhaust gas from a main engine and auxiliary exhaust gas from one or more auxiliary engines, the system comprising:

a storage tank configured to store a powder for treating the exhaust gas; and a dosing assembly fluidly coupled to the storage tank and fluidly coupled to a plurality of exhaust pipelines that carry the main exhaust gas and the auxiliary exhaust gas, wherein the dosing assembly is configured to inject the powder into the exhaust gas at or adjacent each respective turbocharger.

24. The system of claim 23, wherein the dosing assembly is configured to inject the powder into the exhaust gas within fifteen meters of the turbocharger.

25. The system of claim 23, wherein the dosing assembly includes a dosing tank fluidly coupled to the storage tank, and a plurality of injectors fluidly coupled to the dosing tank and configured to inject powder from the dosing tank into the main exhaust gas from the main engine and the auxiliary exhaust gas from the one or more auxiliary engines.

26. The system of claim 23, wherein the dosing assembly includes an injector having a first portion and a second portion, the first portion including a motor, an agitating wheel, and a screw gear mechanically coupled to one another, the second portion having an injecting pipe for injecting the powder into the exhaust gas at or adjacent the turbocharger, wherein the first portion and second portion are fluidly coupled to one another and the agitating wheel is configured to agitate the powder as it flows through the first portion.

27. The system of claim 26, wherein the agitating wheel is oriented at an approximately ninety degree angle relative to the screw gear, the motor rotatably drives the screw gear, and the screw gear rotatably drives the agitating wheel.

28. The system of claim 27, wherein the second portion of the injector includes a nozzle defining a central hole and an annular peripheral gap, and the nozzle is configured to guide the powder through the central hole and the annular peripheral gap.

29. The system of claim 27, wherein the storage tank is a vertical silo.

30. The system of claim 23, wherein the dosing assembly comprises a plurality of blowers fluidly coupled to a plurality of flow lines which convey the powder to the plurality of exhaust pipelines.

31. The system of claim 3, wherein the dosing assembly comprises a plurality of blowers fluidly coupled to a plurality of flow lines which convey the powder to the plurality of exhaust pipelines.

* * * * *